US012695634B2

(12) United States Patent
Verdian et al.

(10) Patent No.: US 12,695,634 B2
(45) Date of Patent: Jul. 28, 2026

(54) SECURE MULTI DISTRIBUTED LEDGER SYSTEM

(71) Applicant: Quant Network Ltd, London (GB)

(72) Inventors: Gilbert Verdian, London (GB); Luke Riley, London (GB); Martin Hargreaves, London (GB); Peter Marirosans, London (GB)

(73) Assignee: Quant Network Ltd, London (GB)

( * ) Notice: Subject to any disclaimer, the term of this patent is extended or adjusted under 35 U.S.C. 154(b) by 321 days.

(21) Appl. No.: 18/037,840

(22) PCT Filed: Nov. 19, 2021

(86) PCT No.: PCT/EP2021/082270
§ 371 (c)(1),
(2) Date: May 19, 2023

(87) PCT Pub. No.: WO2022/106603
PCT Pub. Date: May 27, 2022

(65) Prior Publication Data
US 2024/0007312 A1    Jan. 4, 2024

(30) Foreign Application Priority Data
Nov. 20, 2020    (EP) ..................................... 20209072

(51) Int. Cl.
*H04L 9/00*    (2022.01)
(52) U.S. Cl.
CPC ..................................... *H04L 9/50* (2022.05)
(58) Field of Classification Search
CPC ................................... H04L 9/50; G06F 21/64
See application file for complete search history.

(56) References Cited

U.S. PATENT DOCUMENTS 12,368,598 B2 * 7/2025 Boussard .................. H04L 9/50
2017/0352012 A1 * 12/2017 Hearn .................... G06Q 40/12
(Continued)

FOREIGN PATENT DOCUMENTS

CN        110442652 A    11/2019
EP        3493141 A1    6/2019

OTHER PUBLICATIONS

U.S. Appl. No. 62/992,240, filed Mar. 20, 2020, Le Callonnec; Sébastien.*

(Continued)

*Primary Examiner* — Tan Doan
(74) *Attorney, Agent, or Firm* — Potomac Law Group, PLLC; Marc Kaufman

(57)        ABSTRACT

The present disclosure relates to methods, systems, electronic devices and computer programs to enable the execution of instructions using any of two or more different distributed ledgers. The disclosure includes a computer implemented method for executing instructions that are issued via any of two or more different distributed ledgers, where the method includes monitoring a plurality of distributed ledgers for distributed ledger transactions comprising an instruction to be executed; identifying a first plurality of distributed ledger transactions, each appearing on any of the plurality of distributed ledgers, wherein each of the first plurality of distributed ledger transactions comprises an instruction to be executed; verifying at least some of the first plurality of instructions in the identified first plurality of distributed ledger transactions; and for each of the first plurality of instructions that is positively verified, executing the instruction; and storing, in an electronic data record, a result of the executed instruction. This may enable, for example, a user to issue instructions on two or more different distributed ledgers, with those instructions being executed securely and consistently, and any user data associated with (Continued)

100 the executed instructions updated consistently and reliably, regardless of the distributed ledger on which each instruction is issued.

12 Claims, 11 Drawing Sheets

(56)                    References Cited

U.S. PATENT DOCUMENTS

| | | | |
|---|---|---|---|
| 2018/0075526 A1 | 3/2018 | Chenard et al. | |
| 2018/0101848 A1* | 4/2018 | Castagna | H04L 9/3236 |
| 2019/0287200 A1* | 9/2019 | Schuler | G06Q 50/265 |
| 2020/0311718 A1 | 10/2020 | Verdian et al. | |
| 2021/0297234 A1* | 9/2021 | Le Callonnec | H04L 9/50 |

OTHER PUBLICATIONS

PCT/EP2021/082270, International Search Report and Written Opinion dated Mar. 22, 2022.
PCT/EP2021/082270, Extended Search Report dated Jul. 29, 2021.
Examination Report for European Application No. 24191643.6, dated Mar. 19, 2026.
Office Action and English Translation for Chinese Application No. 202180066280.4, dated Mar. 20, 2026.

* cited by examiner

Layer 2

Layer 1

Data record 115

Second DLT 130

First DLT 120

Fig. 2

Merkle tree of electronic data record 115

Merkle tree of executed instructions

First DLT 120 /
Second DLT 130

Operator 110 /
Monitor entity 160

First User 140

S1130 Check Relevant
Verification Record

S1110 First Status
Enquiry

S1120 Status
Notification

S1140

SECURE MULTI DISTRIBUTED LEDGER SYSTEM

TECHNICAL FIELD

The present disclosure relates to methods, systems, electronic devices and computer programs to enable the execution of instructions using any of two or more different distributed ledgers, for example so that user related data can be securely controlled using any of two or more different distributed ledgers.

BACKGROUND

Distributed ledger technologies (DLTs) have the potential for an enormous range of uses, offering a way in which data may be stored securely and reliably without the need for central data authentication authorities. Consequently, DLTs may enable a whole host of technical benefits across a wide range of sectors, including, for example, improved data transparency, more robust data storage that is not reliant on one particular storage entity, improved data security and improved resistance to fraud, and has already found uses in such diverse sectors as electrical energy distribution and peer-to-peer cloud storage.

Blockchains are an example of a DLT and were first conceptualised in 2009 in a white paper titled "Bitcoin: A Peer-to-Peer Electronic Cash System", published in the name of Satoshi Nakamoto. A copy of the white paper may be found at: https://bitcoin.org/bitcoin.pdf. The white paper proposed a peer-to-peer version of electronic cash called "Bitcoin" that utilised what has since been termed a blockchain to record peer-to-peer transfers of Bitcoin.

A distributed ledger, such as a blockchain or a Block Directed Acyclic Graph (Block DAG) (such as that described in the paper 'Inclusive Block Chain Protocols', authored by Yoad Lewenberg et al—https://fc15.ifca.ai/pre-proceedings/paper_101.pdf), is a digital ledger or electronic data record, using which an effectively immutable record of data may be stored. They may be de-centralised in that they do not necessarily require a central authority to add data to the distributed ledger or to maintain the integrity of the distributed ledger. In some instances they are permissionless, meaning that any entities/nodes may write data to and read data from the distributed ledger. In other instances, they are permissioned, meaning that read and/or write privileges are granted only to permissioned entities/nodes participating in the distributed ledger. Data may be added to a distributed ledger by an entity broadcasting a "transaction" to a network of nodes participating in the distributed ledger network, wherein the transaction comprises the data to be added to the distributed ledger and cryptographic elements that conform with the distributed ledger protocol. Each of the nodes participating in the distributed ledger network may then check the validity of the transaction and, if approved, either add the transaction immediately to their local copy of the distributed ledger, or add the transaction to a block of transactions that they are working on, or add the transaction to an unconfirmed transaction list, awaiting inclusion into a block broadcast from another node.

If a block of transaction is being worked on, then each of the nodes may also add to the new block that they are working on other new transactions that have been broadcast to the network of nodes. After a period of time, a node will publish their new block to the other nodes in the network, the new block including the various new transactions as well as cryptographic data that ties the new block to the preceding block in the blockchain or preceding blocks in the Block DAG. By cryptographically tying consecutive blocks together in this way, if one block in the blockchain or Block DAG is altered at any later time (for example, by someone wishing to fraudulently change the data stored in the blockchain or Block DAG), it may be easily detectable.

After a new block has been published by a node, the other nodes in the network may check the content of the new block and, if accepted the entire contents of the block is added to their local copy of the distributed ledger. Additionally and optionally, each node can now start work on their next new block, which will again be cryptographically tied to its preceding block or blocks. Thus, it can be seen that both the blockchain and the Block DAG will grow each time a new block is published and accepted, with each new accepted block being cryptographically tied to its preceding block or blocks. This process of nodes checking a published new transaction and a published new block and accepting them into their copy of the distributed ledger is often referred to as a "consensus" mechanism.

In the white paper, "Bitcoin: A Peer-to-Peer Electronic Cash System", a particular protocol is proposed for the Bitcoin blockchain. The protocol covers such things as the format and types of information that should be included in a transaction, the format and types of information to be included in new blocks, the cryptographic techniques and recipes that should be used for transactions and new blocks, and the particular type of consensus mechanism to be used (for example, in Bitcoin, the consensus mechanism utilises a hash-based proof-of-work in each block of the blockchain, which is also the cryptographic tie between each consecutive block). If a broadcast transaction does not properly conform to the protocol, it will not be included in any new blocks. Likewise, if a new block does not properly conform to the protocol, it will not be accepted onto the blockchain by the network of nodes.

Whilst DLTs, which include blockchains and Block DAGs, were first proposed to enable the cryptocurrency Bitcoin, they have subsequently found many other uses. At first, new cryptocurrencies were launched, such as Litecoin, Ripple and Namecoin, each operating on their own particular distributed ledger network, utilising their own particular DLT protocols. Since then, it has been recognised that DLTs may be exploited far more widely than cryptocurrencies and may be utilised in any scenario where an effectively immutable record of data is useful. For example, Ethereum and Corda are DLTs that were created for the use of more expressive smart contracts, which are computer programs or instructions that operate on a DLT and may be configured to execute particular processes when particular data appears on the distributed ledger.

Another example DLT is Hashgraph, which uses Block DAGs. This has led to a rapid expansion in the number of different DLTs currently in existence, each tailored to their own particular use case, and it is anticipated that the number of different DLTs will continue to increase as the technology gains further momentum and recognition.

SUMMARY

In a first aspect of the disclosure, there is provided a computer implemented method for executing instructions that are issued via any of two or more different distributed ledgers, the method comprising: monitoring a plurality of distributed ledgers for distributed ledger transactions comprising an instruction to be executed; identifying a first plurality of distributed ledger transactions, each appearing on any of the plurality of distributed ledgers, wherein each of the first plurality of distributed ledger transactions comprises an instruction to be executed; verifying at least some of the first plurality of instructions in the identified first plurality of distributed ledger transactions; and for each of the first plurality of instructions that is positively verified, executing the instruction; and storing, in an electronic data record, a result of the executed instruction.

The method may further comprise, after executing the positively verified instructions of the first plurality of instructions, storing, on at least one of the plurality of distributed ledgers, a first verification record indicative of each stored result in the electronic data record.

The first verification record may be indicative of the order in which the positively verified instructions of the first plurality of instructions were executed. Additionally or alternatively, the first verification record may be indicative of the order in which the results of the first plurality of instructions that were executed was stored in the electronic data record.

The electronic data record may comprise a Merkle tree, wherein the method further comprises updating the Merkle tree of the electronic data record based at least in part on each of the stored results of the executed instructions of the first plurality of instructions; and wherein the first verification record comprises a first Merkle root of the updated Merkle tree of the electronic data record.

The method may further comprise: after executing the positively verified instructions of the first plurality of instructions, generating a first instruction record based on the executed instructions of the first plurality of instructions, wherein the first verification record further comprises the first instruction record.

The first instruction record may be indicative of the order in which the positively verified instructions of the first plurality of instructions were executed.

The first instruction record may comprise a second Merkle root generated using at least part of each of the executed instructions of the first plurality of instructions.

Additionally or alternatively, the first instruction record may comprise a value (for example, a hash) uniquely indicative of at least part of each executed instruction of the first plurality of instructions.

The first verification record may comprise a sequence identifier indicative of a relative order of verification records stored on the at least one of the plurality of distributed ledgers.

The method may further comprise: after storing the first verification record on the at least one of the plurality of distributed ledgers, checking that the first verification record is present on the at least one of the one or more distributed ledgers; and if the first verification record is not present on the at least one of the plurality of distributed ledgers, replaying the first verification record onto the at least one of the one or more distributed ledgers.

The method may further comprise: storing a copy of each executed instruction of the first plurality of instructions; checking that each executed instruction of the first plurality of instructions is present on at least one of the plurality of distributed ledgers; and for each executed instruction of the first plurality of instructions that is not present on at least one of the plurality of distributed ledgers, broadcasting a new distributed ledger transaction to at least one of the plurality of distributed ledgers, the new distributed ledger transaction comprising the executed instruction.

The method may further comprise: determining an order in which to execute the first plurality of instructions that are positively verified; and executing the first plurality of instructions that are positively verified in accordance with the determined order.

The method may further comprise: identifying a second plurality of distributed ledger transactions, each appearing on any of the plurality of distributed ledgers, wherein each of the second plurality of distributed ledger transactions comprises an instruction to be executed; verifying at least some of the second plurality of instructions; and for each of the second plurality of instructions that is positively verified: executing the instruction; and storing, in the electronic data record, a result of the executed instruction.

The method may further comprise after executing the positively verified instructions of the second plurality of instructions, storing, on at least one of the plurality of distributed ledgers, a second verification record indicative of each result stored in the electronic data record as a consequence of the executed instructions of the second plurality of instructions.

The second verification record may be indicative of the order in which the positively verified instructions of the second plurality of instructions were executed.

The electronic data may comprise a Merkle tree, wherein the method further comprises further updating the Merkle tree of the electronic data record based at least in part on each of the stored results of the executed instructions of the second plurality of instructions; and wherein the second verification record comprises a third Merkle root of the further updated Merkle tree of the electronic data record.

The method may further comprise: after executing the positively verified instructions of the second plurality of instructions, generating a second instruction record based on the executed instructions of the second plurality of instructions, wherein the second verification record comprises the second instruction record.

The second instruction record may be is indicative of the order in which the positively verified instructions of the second plurality of instructions were executed The second instruction record may comprise a fourth Merkle root generated using at least part of each of the executed instructions of the second plurality of instructions. Additionally or alternatively, the second instruction record may comprise a value (for example, a hash) uniquely indicative of at least part of each executed instruction of the second plurality of instructions.

The second verification record may comprise a sequence identifier indicating that the second verification record follows the first verification record.

The method may further comprise: determining an order in which to execute the second plurality of instructions that are positively verified; and executing the second plurality of instructions that are positively verified in accordance with the determined order.

At least one of the plurality of first distributed ledger transactions may appear on a first distributed ledger of the plurality of distributed ledgers and comprises an instruction for executing a process associated with a first user; and at least one other of the plurality of first distributed ledger transactions may appear on a second distributed ledger of the plurality of distributed ledgers and comprises an instruction for executing a further process associated with the first user.

The instruction for executing a process associated with the first user may comprise an instruction to modify data associated with the first user; and the instruction for executing a further process associated with the first user may comprise an instruction to further modify the data associated with the first user.

At least one of the plurality of first distributed ledger transactions may appear on a first distributed ledger of the plurality of distributed ledgers and comprise an instruction for executing a process associated with a first user; and wherein at least one of the plurality of second distributed ledger transactions may appear on a second distributed ledger of the plurality of distributed ledgers and may comprise an instruction for executing a further process associated with the first user.

The instruction for executing a process associated with the first user may comprise an instruction to modify data associated with the first user; and the instruction for executing the further process associated with the first user may comprise an instruction to further modify the data associated with the first user.

Each of first plurality of instructions may comprise an identifier of a user associated with the instruction; wherein each result of executed instruction is stored in the electronic data store with an association to the user that is associated with the executed instruction.

The method may further comprise: receiving a first status enquiry in relation to a state of electronic data that is stored in the electronic data store with associated to a first user; and communicating, in response to the first status enquiry, a status notification comprising: an indication of the state of electronic data associated with the first user, and a proof of state for use in verifying the indicated state of electronic data associated with the first user.

The first status enquiry may be in relation to a current state of electronic data associated with the first user; and wherein the status notification may further indicate a verification record stored on one or more of the plurality of distributed ledgers corresponding to the stored result of the executed instruction record that caused the current state of data associated with the first user.

The first status enquiry may further comprise an identifier of a verification record stored on one or more of the plurality of distributed ledgers, and wherein the indication of the state of electronic data may be an indication of the state of electronic data associated with the first user at the time of the identified verification record.

The electronic data record may comprise a Merkle tree, and wherein the proof of state comprises a Merkle proof, and wherein the verification record corresponding to the indicated state of electronic data associated with the first user comprises a Merkle root that was generated based at least in part on the stored result of the executed instruction that caused the indicated state of electronic data associated with the first user.

In a second aspect of the present disclosure, there is provided a computer program (such as a non-transitory computer program) configured to perform the method of the first aspect when executed on at least one processor of an electronic device.

In a third aspect of the present disclosure, there is provided an electronic device (for example, the operator disclosed herein) configured to perform the method of the first aspect. For example, the electronic device may comprise one or more processors and memory comprising a computer program configured to perform the method of the first aspect when executed on any of the one or more processors.

In a fourth aspect of the present disclosure, there is provided a computer implemented method for monitoring the execution of instructions that are issued via any of two or more different distributed ledgers, the method comprising: monitoring a plurality of distributed ledgers for distributed ledger transactions comprising an instruction to be executed; identifying a first plurality of distributed ledger transactions, each appearing on any of the plurality of distributed ledgers, wherein each of the first plurality of distributed ledger transactions comprise an instruction to be executed; identifying a first verification record stored on at least one of the plurality of distributed ledgers, wherein the first verification information is for verifying the execution of an instruction in the first plurality of instructions; and verifying the execution of the instruction using the first verification information.

A result of each executed instruction may be stored in an electronic data record, and wherein the first verification record may comprise a first statement of data modification indicative of the electronic data record after the result of execution of the instruction to be verified has been stored in the electronic data record, wherein verifying the execution of the instruction uses at least the first statement of data modification.

Verifying the execution of the instruction may further use a preceding verification record that is stored on at least one of the plurality of the plurality of distributed ledgers and precedes the first verification record.

The preceding verification record may comprise a preceding statement of data modification indicative of the electronic data record before the instruction to be verified was executed; and wherein verifying the execution of the instruction uses at least the preceding statement of data modification.

The electronic data record may comprise a Merkle tree, and wherein the first statement of data modification comprises a first Merkle root; and wherein the preceding statement of data modification comprises a preceding Merkle root.

Verifying the execution of the instruction may comprise verifying an order in which at least some of the first plurality of instructions were executed. Optionally, verifying the order in which at least some of the first plurality of instructions were executed may further use one or more further verification records.

The method may further comprise: receiving a first status enquiry in relation to the current state of data associated with a first user in an electronic data record that stores results of each executed instruction; and communicating, in response to the first status enquiry, a status notification comprising: an indication of the current state of data associated with the first user; an identifier of the verification record stored on one or more of the plurality of distributed ledgers that comprises a verification record for use in verifying the indicated current state of data associated with the first user; and a proof of state for use in verifying the indicated current state of data associated with the first user.

The method may further comprise: receiving a second status enquiry in relation to a state of data associated with a first user in an electronic data record that stores results of each executed instruction, wherein the second status enquiry comprise an identifier of a verification record stored on one or more of the plurality of distributed ledgers; and communicating, in response to the second status enquiry, a status notification comprising: an indication of the state of data associated with the first user at the time of the identified verification record; and a proof of state for use in verifying the indicated state of data associated with the first user at the time of the identified verification record.

In a fifth aspect of the present disclosure, there is provided a computer program (such as a non-transitory computer program) configured to perform the method of the fourth aspect when executed on at least one processor of an electronic device.

In a sixth aspect of the present disclosure, there is provided an electronic device (for example, the monitor entity disclosed herein) configured to perform the method of the fourth aspect. For example, the electronic device may comprise one or more processors and memory comprising a computer program configured to perform the method of the fourth aspect when executed on any of the one or more processors.

In a seventh aspect of the present disclosure, there is provided a computer implemented method for a first user to verifying a state of data that is associated to them and stored on an electronic data record, the method comprising: outputting a status enquiry in relation to the state of data associated with the first user in the electronic data record wherein the status enquiry comprises an identifier of the first user; receiving a status notification comprising: an indication of the state of data associated with the first user and a proof of state for use in verifying the indicated state of data associated with the first user; identifying a verification record on one or more of a plurality of distributed ledgers for use in verifying the indication of state of data associated with the first user; and verifying the indication of the state of data associated with the first user using the proof of state and the identified verification record.

The status notification may comprise an indication of the verification record.

In an eighth aspect of the present disclosure, there is provided a computer program (such as a non-transitory computer program) configured to perform the method of the seventh aspect when executed on at least one processor of an electronic device.

In a ninth aspect of the present disclosure, there is provided an electronic device (for example, the first user or second user disclosed herein) configured to perform the method of the seventh aspect. For example, the electronic device may comprise one or more processors and memory comprising a computer program configured to perform the method of the seventh aspect when executed on any of the one or more processors.

In a tenth aspect of the present disclosure, there is provided a computer implemented method of issuing, using any of a plurality of different distributed ledgers, instructions to be executed, the method comprising: issuing to a first distributed ledger of the plurality of different distributed ledgers a first instruction to be executed, the first instruction comprising an identifier of a first user, wherein execution of the first instruction results in modification of data associated with the first user and stored in an electronic data record; and issuing to a second distributed ledger of the plurality of different distributed ledgers a second instruction to be executed, the second instruction comprising an identifier of the first user, wherein execution of the second instruction results in modification of data associated with the first user and stored in the electronic data record.

In an eleventh aspect of the present disclosure, there is provided a computer program (such as a non-transitory computer program) configured to perform the method of the tenth aspect when executed on at least one processor of an electronic device.

In a twelfth aspect of the present disclosure, there is provided an electronic device (for example, the operator disclosed herein) configured to perform the method of the tenth aspect. For example, the electronic device may comprise one or more processors and memory comprising a computer program configured to perform the method of the first aspect when executed on any of the one or more processors.

DRAWINGS

Aspects of the present disclosure are described, by way of example only, with reference to the following drawings, in which:

FIG. 2 shows a conceptual visualisation of the layering of the data record, the first DLT and the second DLT of the system of FIG. 1;

DETAILED DESCRIPTION

The inventors have recognised that as distributed ledger technology (DLT) grows and develops, it may become increasingly difficult for different entities to securely, safely and reliably make use of it. For example, if one particular DLT is chosen for managing data or assets/data assets (such as financial assets/tokens, for example digital currency or cryptocurrency, or any other form of data/information/instructions to be stored securely or executed via the DLT), it may be very difficult to migrate the data or assets/data assets to a different DLT in the event that the originally chosen DLT proves to be insecure, or unreliable, or obsolete. Therefore, the inventors have realised that there may be benefits to having the same data controlled using two or more different DLTs. This may enhance the data security and reliability of DLTs since the stored data would no longer be tied to a single particular DLT platform, which may suffer from any number of known/unknown security vulnerabilities, attacks and/or other flaws/imperfections in the future. However, this presents many different technical challenges. For example, if the same data can be controlled using two or more different DLTs, it may be independently modified via two different independent mechanisms.

This may result in a security and stability vulnerabilities as a result of transactions/instructions relating to the data being processed inconsistently and/or in the incorrect order. Furthermore, if the data is not consistently updated for all of the two or more DLTs, there may be inaccuracies/inconsistencies across the different DLTs, which may represent further security/stability risks. This may be important where the data being controlled is a digital currency, for example resulting in double spends or other types of accidental/deliberate fraud, but is also important more generally for all types of DLTs and data records. Further details of the technical problems this presents, as well as the technical solutions developed by the inventors, are set out later, particularly in relation to handling blockchain rollbacks.

Throughout the following disclosure, the terms 'blockchain', 'distributed ledger', 'blockchain technology' and 'distributed ledger technology (DLT)' are used interchangeably. It will be understood that a blockchain is one particular type of DLT, but the invention is equally applicable to other types of DLT such as Block DAGs.

Figure 1:
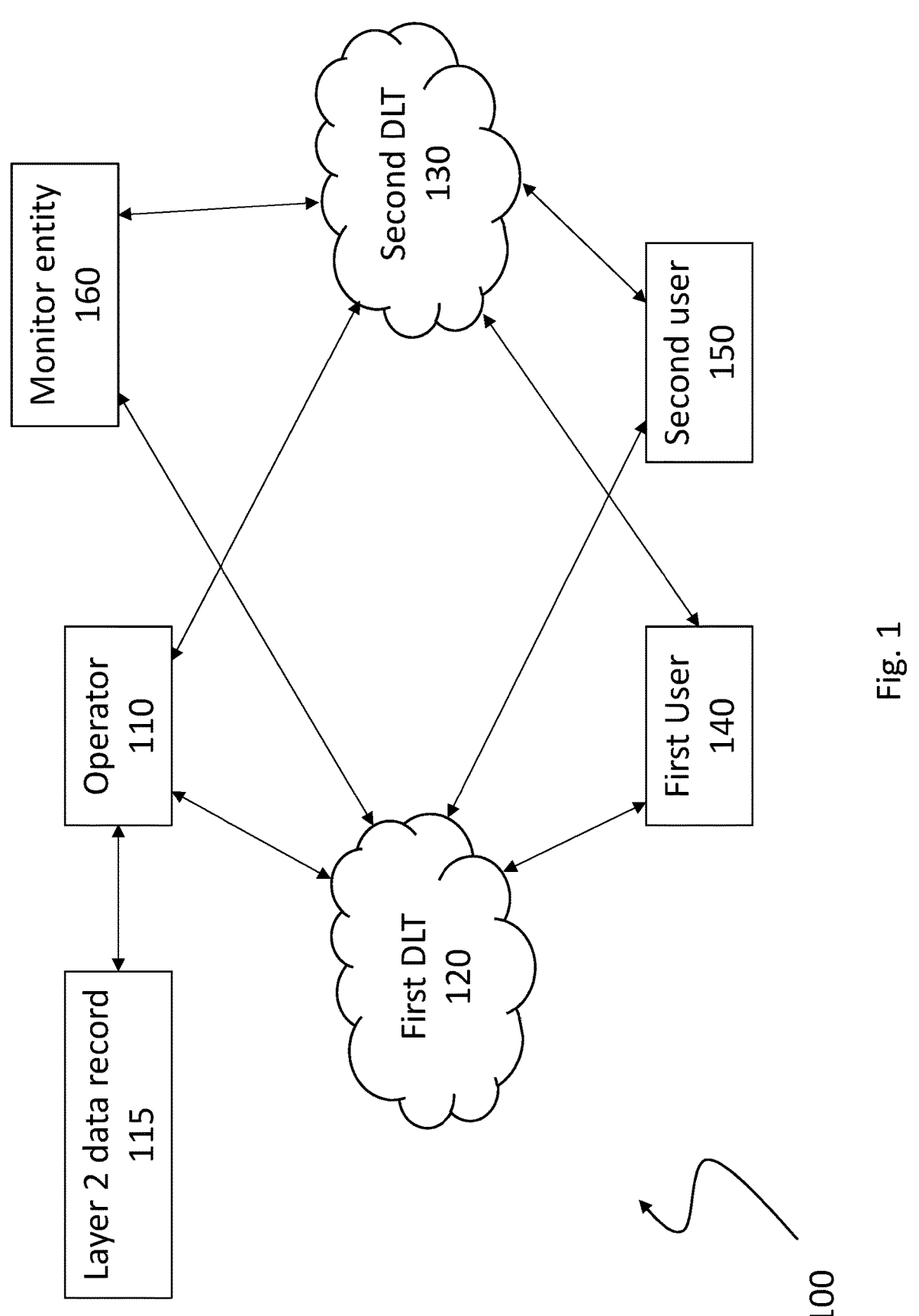
FIG. 1 shows an example representation of a system 100 in accordance with an aspect of the present disclosure.

Therefore, wherever the term 'blockchain' is used, it will be understood that the disclosure applies equally to any other type of DLT. Furthermore, throughout the following disclosure, the term 'transaction' is used in relation to DLTs. The person skilled in the art will appreciate that a 'transaction' in this context is not limited to a transfer of ownership of something, for example currency. Instead, a 'transaction' is the means by which some form of information may be put on a DLT. For example, an entity may broadcast a 'transaction' to be put on a DLT, the transaction comprising the information to be put on the DLT as well as any other data items (such as public keys, a signature, a hash, etc) that are required in order for the transaction to be accepted onto the DLT. The information to be put onto the DLT may relate to a financial transfer of currency, but may alternatively be any other sort of data or information (for example a piece of data that an entity wishes to store on a DLT for their own reference later, or an instruction for executing some further processing, for example via a computer program (such as a smart contract) that may be triggered by the instruction). Therefore, alternative terminology to a 'transaction' may be used, such as a DLT/blockchain 'instruction' or a DLT/blockchain 'message' FIG. 1 shows an example representation of a system 100 in accordance with an aspect of the present disclosure. The system 100 comprises an operator 110, an electronic data record 115 that is controlled/maintained at least in part by the operator 110, a first DLT network 120, a second DLT network 130, a first user 140, a second user 150 and a monitor entity 160. Each of the operator 110, first user 140, second user 150 and monitor entity 160 may each be implemented as part of any suitable electronic computing device/entity, for example as part of a server, or a computer, or a mobile computing device such as a smartphone, a tablet, a laptop, etc. For example, the functionality (described below) of each of the operator 110, first user 140, second user 150 and monitor entity 160 may be encoded in software/a computer program, which may be stored in memory on a computing device and executed using one or more processors of the computing device. Whilst two different users are represented, the system 100 may alternatively include only one user, or three or more users, each configured to perform the user operations described below.

Whilst two DLTs are represented in FIG. 1, the operator 110, first user 140, second user 150 and monitor entity 160 may interface with any number of DLTs. Each DLT may have its own particular protocol for DLT operations, such as reading data from a blockchain and/or writing data to the blockchain and/or transferring ownership of data from one entity to another entity on the same blockchain. Each DLT may be permissioned or permissionless. By way of non-limiting examples, each DLT may be operated according to the protocols of any of Bitcoin, Ethereum, Corda, Quorum, Hyperledger, etc.

The electronic data record 115 may be implemented as any suitable form of datastore, for example it may be implemented as a DLT in which the operator 110 is participating (for example, a permissioned blockchain that the operator has permission to edit), or it may be a non-blockchain data record, such as any form of database managed at least in part by the operator 110.

Whilst not represented in FIG. 1, the operator 110 and the monitor entity 160 may optionally be in communication with each other. The operator 110 and the first user 140 may optionally be in communication with each other. The operator 110 and the second user 150 may optionally be in communication with each other. The monitor entity 160 and the first user 140 may optionally be in communication with each other.

The monitor entity 160 and the second user 150 may optionally be in communication with each other. Each of the communications interfaces may be implemented using any suitable electronic communications protocol/standard. Whilst each communications interface represented in FIG. 1 is a direct connection, it will be appreciated that there may optionally be any number of intermediate devices/entities in the communications path.

Figure 2:
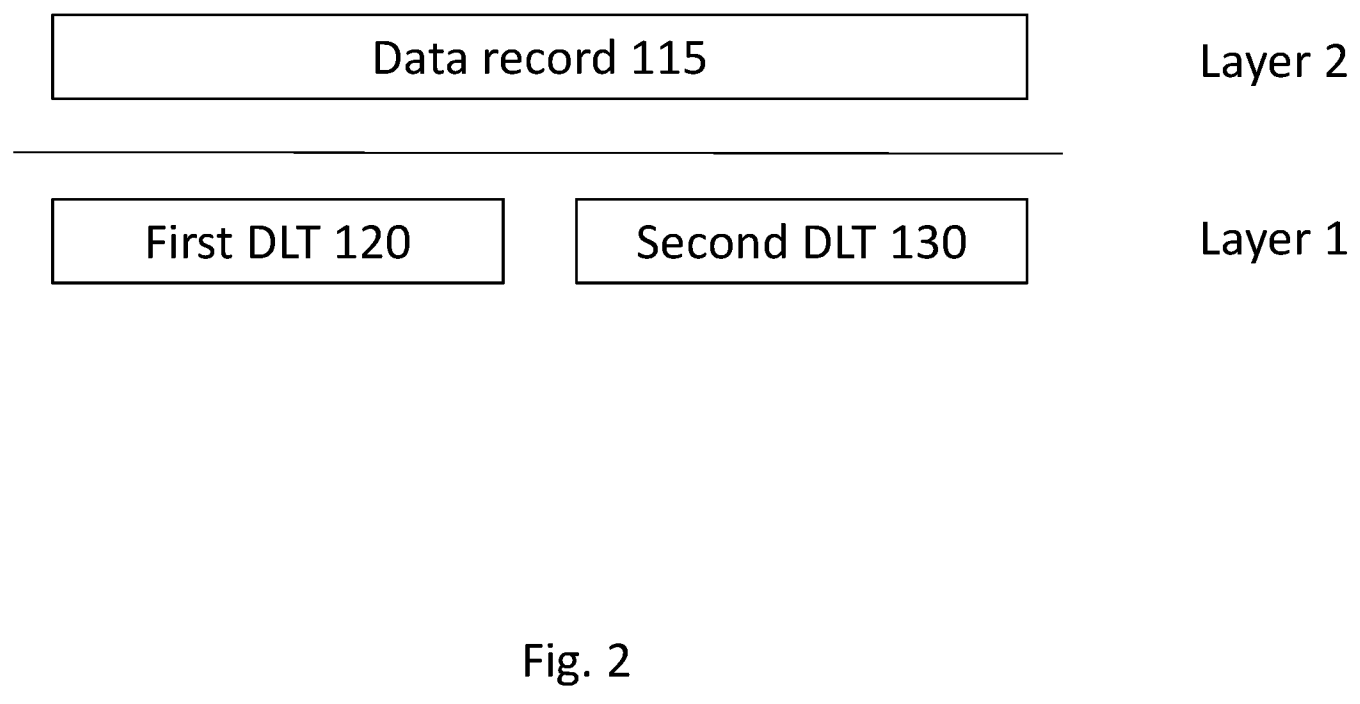

FIG. 2 shows a conceptual visualisation of the layering of the data record 115 and the first DLT 120 and the second DLT 130. The DLTs 120 and 130 may be thought of as being in 'Layer 1' of the system structure. There may be any number of different DLTs in Layer 1, each of which are editable and readable by the different participants in the system 110, for example the operator 110, the first user 140, the second user 150 and the monitor entity 160. The data record 115 may be thought of as being in 'Layer 2' of the system structure. The Layer 2 data record 115 is maintained/controlled by the operator 110. In the system 100 of the present disclosure, the particular data items or assets may be controlled using two or more of the Layer 1 DLTs. For example, the first user 140 may have a data asset, such as an amount of digital currency or any other form of information/data that they wish to control using two or more Layer 1 DLTs. This data may be controlled by virtue of instructions that they post to either the first DLT 120 or the second DLT 130. The operator 110 uses the Layer 2 data record to maintain the consistency of data that is controlled simultaneously by two or more of the Layer 1 DLTs. In this way, data associated with a user may be modified by virtue of transactions/instructions posted to any one of the plurality of Layer 1 DLTs, in a way that is secure and consistent across all of the Layer 1 DLTs. Layer 1 may conceptually be thought of as sitting on top of Layer 0 of the system, which would be the public/private networks on which the Layer 1 DLTs run.

Figure 3:
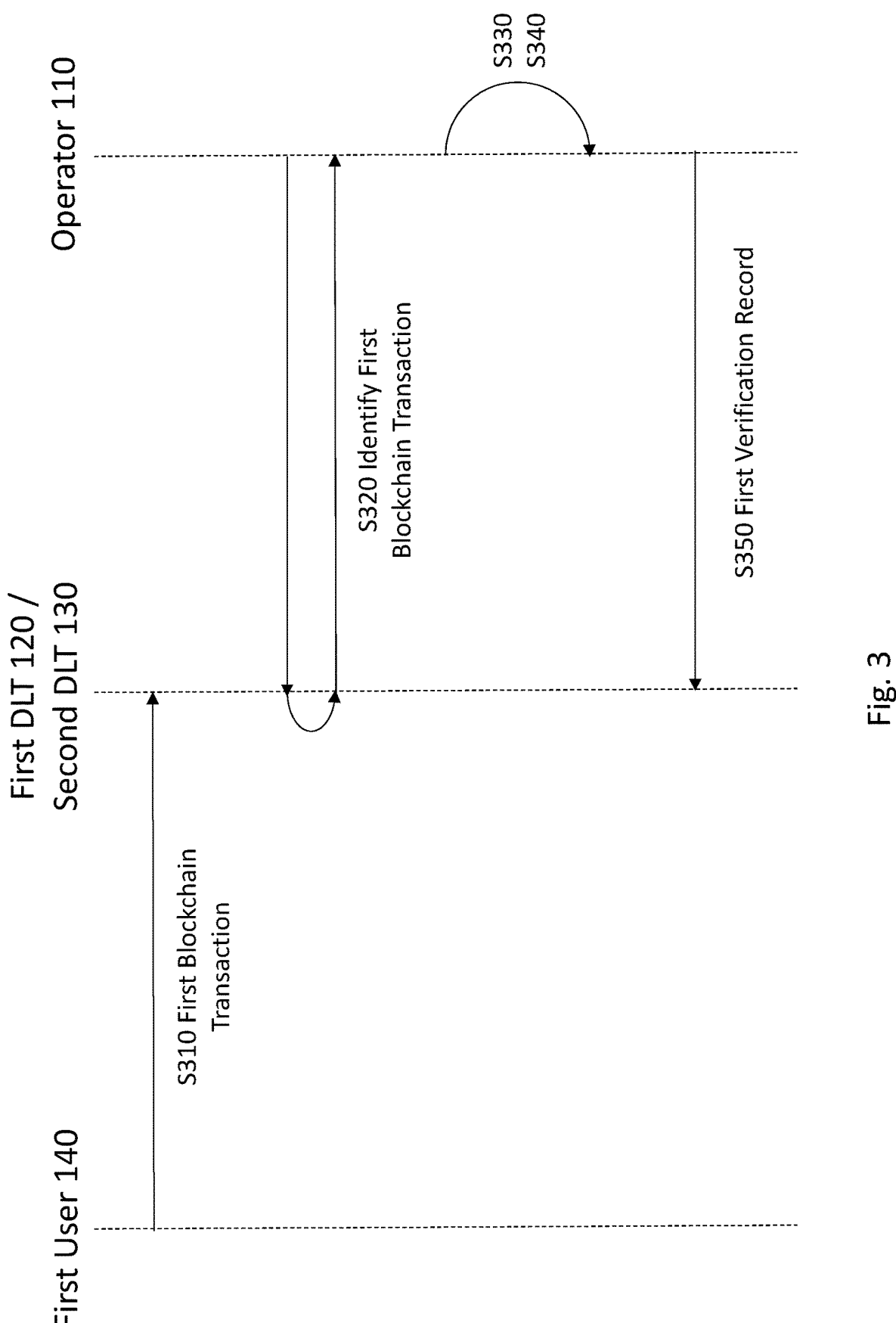
FIG. 3 shows a sequence diagram representing an example process by which the first user of the system of FIG. 1 may modify data that is associated with them.

FIG. 3 shows a sequence diagram representing an example process by which the first user 140 may issue instructions to be executed.

In step S310, the first user 140 broadcasts a first DLT transaction 400 (referred to from here on as a first blockchain transaction) to either the first DLT 120 or the second DLT 130.

Figure 4:
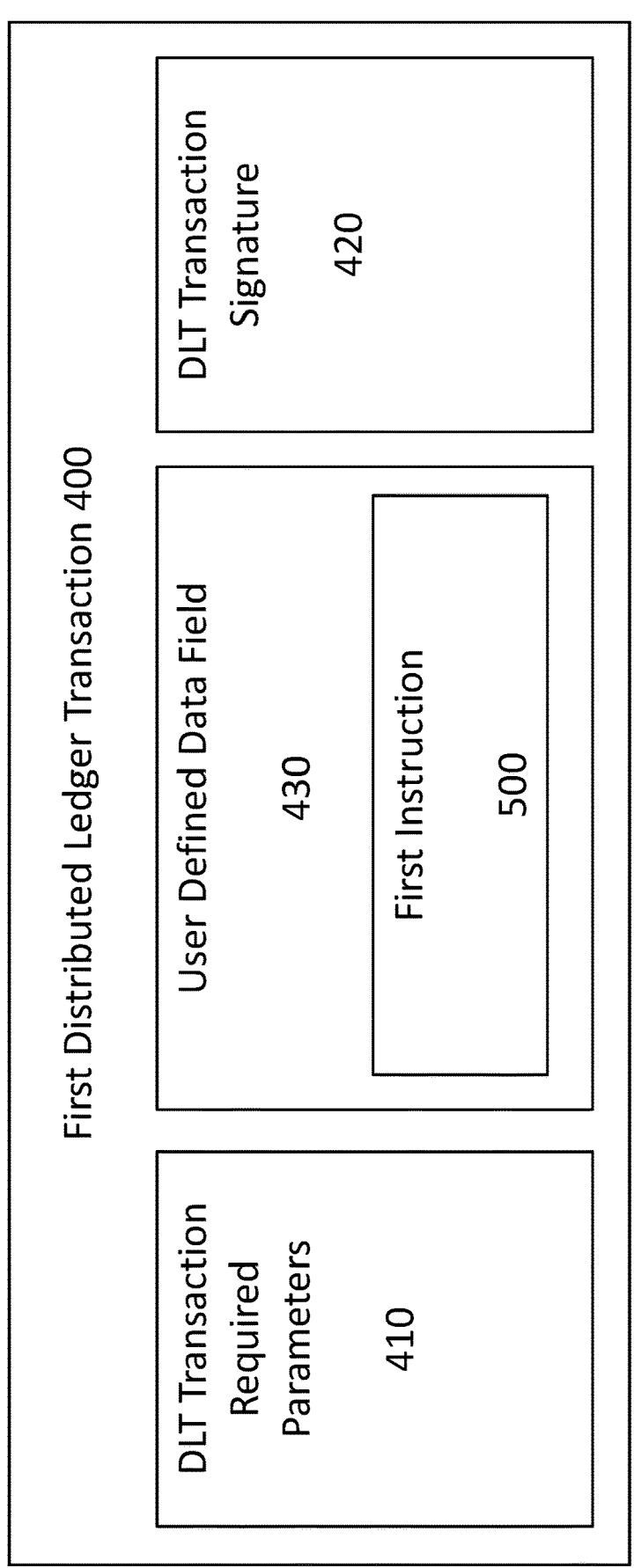
FIG. 4 shows an example visualisation of data included in a blockchain transaction as part of the process of FIG. 3.

FIG. 4 shows an example visualisation of data included in the first blockchain transaction 400. The first blockchain transaction 400 may be formatted in accordance with the protocol used for whichever DLT it is broadcast to, such as including DLT Transaction Required Parameters 410 (which may include any one or more of, for example, a sender address, a recipient address, a transaction fee, etc) and a DLT Transaction Signature 420. The DLT Transaction Signature 420 may be generated by the first user 140 by signing the content of the first blockchain transaction 400 using their DLT private key, in accordance with the encryption protocols used for whichever DLT the first blockchain transaction 400 is broadcast to. In accordance with the present disclosure, the first user 140 includes a first instruction 500 in the first blockchain transaction. As will be understood by the skilled person, blockchain transactions typically have an available user defined data field 430, and the first instruction 500 may be included in the user defined data field 430.

Figure 5:
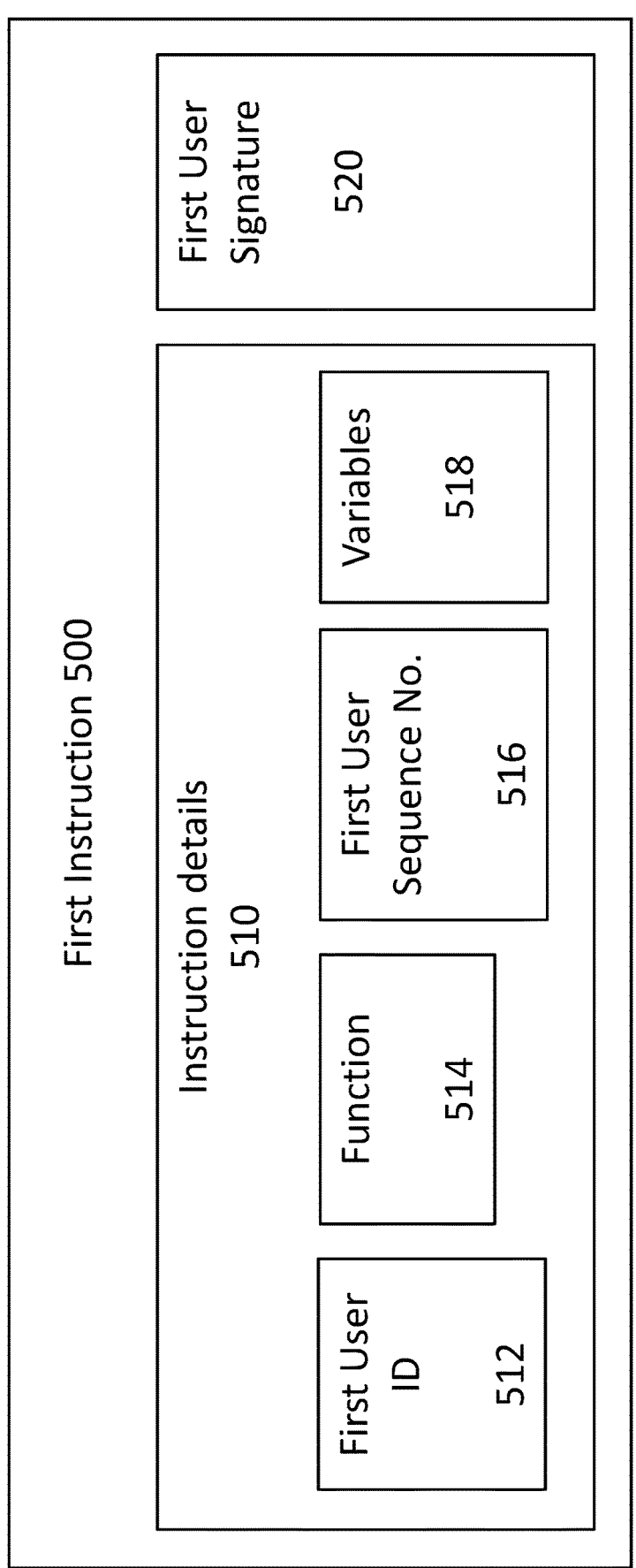
FIG. 5 shows an example visualisation of data included in the instruction in the blockchain transaction of FIG. 4.

FIG. 5 shows an example visualisation of data included in the first instruction 500. The first instruction 500 may be configured to include data using which the operator 110 can identify the first user 140, as well as data indicating the nature of the instruction. For example, the instruction may be to execute some modification to the first user's data in the electronic data record 115, or an instruction to trigger some computer program/process (such as a smart contract) held on the electronic data record 115 or held elsewhere and linked to the operator 110 or electronic data record 115 so that execution of the instruction triggers the computer program/process, and any other data required according to any security/cryptography procedures set by the operator 110. In this example, the first instruction 500 comprises a first user ID 512, using which the operator 110 may uniquely identify the first user and therefore any data within the Layer 2 data record 115 that is associated with the first user 140. The first user ID 512 may be uniquely indicative of the first user 140, or the first user 140 may have a plurality of different first user IDs each relating to some different data of theirs in the Layer 2 data record 115. In that case, the first user ID 110 may be viewed as an account ID that identifies a Layer 2 account of the first user 140.

In the example represented in FIG. 5, the nature of the instruction is indicated using the Function 514 and the Variables 518. Various different functions may be available for the first user 140 to set, for example 'trigger', 'send', 'delete', 'replace', 'transfer', 'add', etc, depending on the particular types of instruction that the system 100 is configured to allow. The Variables 518 may comprise any data required to carry out the indicated instruction (for example, data that is to be added to the data record 115, or an identifier of a computer program/routine to be triggered, or another user account whose data is also to be modified in some way, or the content and recipient of a message to be communicated, etc). By way of example, if the first user holds multi-DLT digital currency within a Layer 2 account, the function 514 may indicate that a financial transfer of some amount of the first user's currency is desired. In this case, the modification function 514 may be set to indicate 'transfer' and the variables may indicate the amount to be transferred and the Layer 2 account to which the amount is to be transferred. In a further example, the function 514 may indicate that a particular process or operation is to be performed/triggered, with the variables 518 including any data required for that to happen, such as an identification of the address of the routine to be performed and/or a payload to be passed to the routine, etc.

In the example represented in FIG. 5, the security/cryptography requirements of the multi-DLT system 100 are set to require the instruction details 510 to include a first user sequence number 516 and the first instruction 500 to include a first user signature 520 (although both the user sequence number 516 and first user signature 520 are optional and in some implementations the operator 110 may not require one or both of them to be present in a transaction in order to positively verify the transaction). The first user sequence number 516 may be a value that the first user 140 increments/decrements with each new instruction that it generates. This may enable the operator 110, when performing the process of Step S330 described below, to enhance the security of the multi-DLT system 100, for example to prevent replay attacks, and/or check the relative execution ordering that may be required for instructions from the first user 140. The first user signature 520 may be a digital signature of the instruction details 510, generated using a private key associated with the first user 140 in accordance with whatever cryptography protocol(s) is defined by the system security standards for the execution of instructions. The cryptography standard used for the first user signature 520 in order to secure the first instruction 500 may be different to the cryptography standard used for the DLT Transaction Signature 420. As a result, the operations performed at the layer 2 data record may be secured to a higher cryptography standard than is used for the first DLT 120 and/or second DLT 130. As a result, the present disclosure may enhance the data security of the first DLT 120 and/or second DLT 130 on which the system operates.

It will be appreciated that different Layer 1 DLTs may require different types of DLT Transaction Required Parameters 410 and/or DLT Transaction Signature 420, but the content of the instruction 500 may always be the same regardless of the DLT to which it is sent. As a result, each different instruction broadcast to any of the Layer 1 DLTs may be uniquely identified from its content and optionally a unique cross-DLT ID may be generated for each instruction, for example by generating a hash of the instruction 500 or the instruction details 510 (see, for example, the instruction record 616 described later).

The operator 110 is configured to monitor the first DLT 120 and second DLT 130 for distributed ledger transactions that include an instruction. For example, the operator 110 may be running a participating node on the first and second DLTs and receive each broadcast transactions. Additionally or alternatively, they may read the content of each block (each of which includes a plurality of distributed ledger transactions) that is added to the first and second DLTs. Additionally or alternatively, the operator 110 may not be running a node of the first and second DLTs, but instead monitor the one or more of the first and second DLTs by querying an entity that is running a node on the first and second DLTs networks.

In Step S320, the operator 110 identifies the first distributed ledger transaction as a transaction that comprises an instruction to be executed. It will be appreciated that each of the first and second DLTs may include many distributed ledger transactions that are not relevant to the present disclosure (for example, if they are general purpose DLTs, such as Ethereum), in which case the operator 110 is configured to identify distributed ledger transactions that include an instruction so other transactions on the DLTs can be ignored. There are various different ways in which the operator 110 may identify a transaction that includes an instruction to be executed and these different possibilities are not the subject of the present disclosure. Therefore, a detailed explanation is not given in the present disclosure, but by way of brief example only it is noted that the operator 110 may evaluate the content of every transaction to look for data in the form of an instruction described with reference to FIG. 5, or it may be configured to look for data in the DLT Transaction Required Parameters 410 and/or the User Defined Data Field that identifies a user/account that is registered with the operator 110 (for example, using the first user ID 512, or the Layer 2 account ID to which a transfer is being instructed, and comparing those to user IDs/account IDs that are registered with the operator 110 etc), or look for any other item of data in the transactions that mark them out as relevant to the operator 110 (such as a flag indicating that the transaction includes an instruction to be executed).

In Step S330, after identifying the first distributed ledger transaction 400 as being of relevance, the operator 110 verifies the first instruction 500. Verification may include any one or more of: checking for correct formatting of the instruction; checking the first user signature 520 using a cryptographic key registered to the first user and standard symmetric/asymmetric cryptographic techniques; checking that the first user sequence number 516 meets expectations (for example, that the operator 110 has not previously seen that value included in a previously identified instruction from the first user 140 and/or that the included value correctly increments/decrements from the preceding instruction from the first user 140).

It will be appreciated that many different instructions may appear on the first and/or second DLT 120 and 130 from a variety of different users (for example, the first user 140, second user 150, etc). The operator 110 may continually monitor the first and second DLTs for these instructions and, when identified, verify the contents of them.

For example, the operator 110 may store (for example, in part of the layer 2 data record 115, or in any other memory accessible to the operator 110) a copy of each identified instruction and then periodically or intermittently verify one or more of the identified instructions (for example, verifying in order of time when the instructions were identified so that the oldest instructions are verified first, or verifying in the order of any sequencing identified in the instruction, or verifying in any other order, etc). Optionally, a copy of each instruction that is positively verified (i.e., passes all of the verification checks) may be recorded by the operator 110 (for example, in part of the layer 2 data record 115, or in any other memory accessible to the operator 110) and marked as 'pending'. Periodically, the operator 110 may then select one or more pending instructions for execution (for example, prioritising based on time spent pending, or prioritised according to any other requirements such as any sequencing identified in the instructions, or executing according to any other ordering scheme or process). Alternatively, the operator 110 may immediately execute each instruction after positive verification.

Before executing identified instructions, the operator 110 may be configured to determine the order in which to execute the instructions. This may be performed before verification of the identified instruction, for example if instructions are executed immediately on positively verification, or after verification, for example if the operator verifies instructions and adds positively verified instructions to a 'pending' pool from which it selects instructions for execution. It will be appreciated that the operator 110 may be configured to determine the order of execution in any suitable way depending on the particular implementation of the system 100. For example, it may make the determination based on any execution sequence rules the operator 110 is configured to follow and/or the content of the instructions (for example, following any sequence numbering included in the User Sequence No. 516/Variables 518, or determining the correct order based on the nature of the instructions, such as the function 514 and/or the variables 518) and/or the time at which the operator 110 identified the instruction (for example, executing instructions in the order in which they were identified). In this way, the correct sequencing of instruction execution may be maintained by the operator 110 regardless of the Layer 1 DLT on which each instruction was posted, which maintains the security, reliability and robustness of the system 100.

In step S340, the positively verified first instruction 500 is executed. For example, if the instruction details 510 indicate that the first user 512 would like to transfer an amount of currency from their Layer 2 account to the Layer 2 account of a different user, the operator 110 will modify the electronic data record 115 to reflect that change by storing a result of that executed instruction (in this case, the result would comprise reducing in the balance of the first user's account and increasing the balance of the different user's account). In a further example, if the instruction details 510 include further data that the first user 140 wishes to store, the operator 110 will store that further data in the electronic data record 115 with an association to the first user ID 512 as a result of the executed instruction. In a further example, if the modification details 510 are an instruction to trigger some other process (for example, to invoke a Layer 2 smart contract or some other form of computer code/program to execute a particular process), the operator 110 will execute those instructions and store in the electronic data record 115 a result of the executed instruction (optionally with an association to the user ID 512, so that the user can later query the current state of their data in the electronic data record 115, that state being dependent on the stored result). In this example, the stored result may, for example, be a value returned by the triggered process such as a receipt or an outcome or a response of the process and/or may be computer code included within the instructions details 510, the storage of which might optionally trigger further processes and cause an outcome that is also to be stored as part of the result.

Optionally, for all types of stored result, the stored result may comprise a sequence number (for example, the sequence number 516, which may then create a further link between the executed instruction and the result; or a sequence number that changes for each further update to data associated with the first user, for example incrementing or decrementing with each stored result associated with the user; or a sequence number that changes with each result that is stored by the operator 110, for example incrementing or decrementing with each new stored result regardless of the user to which it is associated). For example, each stored result may comprise: a sequence number; the new data resulting from execution of the instruction, such as the new account balance, or the returned response/receipt/outcome of executing the instruction, etc. It may optionally also comprise the user ID of the user associated with the result, or the user may be associated within the electronic data record 115 to the stored result in any other way. As such, a historical record of each stored result may be built up.

The number of stored results does not necessarily tally in a 1:1 ratio with executed instructions. For example, an executed instruction may result in two different stored results, such as a reduction in a balance for one user (which would be one stored result) and an increase in a balance for another user (which would be another stored result).

Furthermore, if a set of instructions are executed (described later in the context of a 'verification set') and two instructions cause changes to data stored in relation to a particular user, the operator 110 may be configured either to store a separate result for each instruction, or may be configured to store a single result for the particular user which is the outcome of executing both of the two instructions.

The operator 110 may store/record (for example, in part of the layer 2 data record 115, or in any other memory accessible to the operator 110) the entire content of the first instruction 500, for example in a 'verification set'. As explained in some further detail later in the section 'instruction execution ordering', the operator 110 may keep a record of each executed instruction in a series of consecutive verification sets, each verification set comprising one or more executed instructions. This record may be useful for the verifiability of the ordering of executed transactions and/or for handling blockchain rollbacks, as explained further in the section 'instruction execution ordering'.

In step S350, the operator 110 stores, on the first DLT 120 and/or second DLT 130, a first verification record 600 that is indicative of the stored result (in the electronic data record 115) of the executed first instruction 500.

Figure 6:
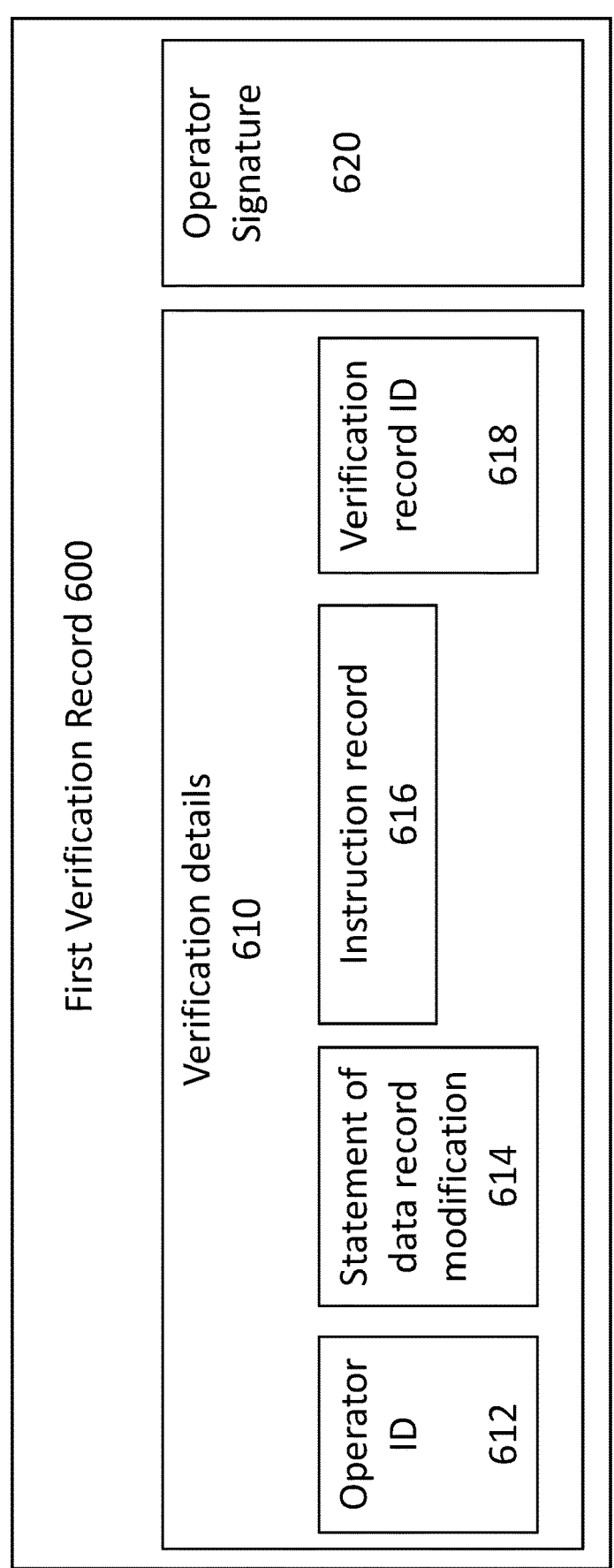
FIG. 6 shows an example visualisation of data included in a verification record as part of the process of FIG. 3.

FIG. 6 shows an example visualisation of data included in the first verification record 600. A purpose of the first verification record 600 is to enable the first user 140 and/or the monitor entity 160 to verify that the instruction(s) were correctly executed by the operator entity 110. The verification details 610 may comprise information that enables the first user 140 and/or the monitor entity 160 to make this verification. The operator signature 620 is optional and is a digital signature of the verification details 610 that the operator 110 generates using a private key associated with them, to prove that the first verification record 600 has originated from the operator 110. This may be used to check the integrity of the first verification record 600 and to ensure that the first verification record 600 has originated from an entity that has the authority to execute the instructions and modify the layer 2 data record 115, and can therefore be trusted. However, trust of the origin and content of the first verification record 600 may be achieved in any other suitable way.

The verification details 610 comprise a statement of data record modification 614, which is indicative of the Layer 2 data record 115 after the result of the executed instruction has been stored (for example, it may be indicative of the stored result of the executed instruction). This can be used by the first user 140 and/or the monitor entity 160 to verify the executed instruction. In one particular example where the layer 2 data record 115 comprises a Merkle tree, when the operator 110 records a result of an executed instruction, they may update the Merkle tree using the stored result and the statement of data record modification 164 may comprise a Merkle root of the updated Merkle tree.

Where the verification record is for use in verifying two or more stored results, such as when two or more instructions have been executed (for example, where its corresponding verification set includes two or more instructions), the statement of data record modification 614 may be indicative of the order in which the results were stored.

In some configurations, the order in which the results were stored may also be indicative of the order in which the corresponding instructions were executed (for example, when the operator 110 is configured to store a result for each instruction it executes, it may store those results in the Merkle tree in the same order in which the instructions were executed). However, in other implementations, the order in which the results were stored may not be indicative of the instruction execution order, for example where two or more potentially non-consecutively executed instructions cause just one result to be stored. Making the statement of data record modification 614 indicative of the order in which the results were stored may be achieved in many different ways by generating the statement of data record modification in a way that is dependent on the order in which the results were stored, for example using a Merkle tree as described later.

In a further example, the layer 2 data record 115 may not comprise a Merkle tree but may be structured in any other way. In this case, the way in which the data is stored in the layer 2 data record 115 may be indicative of the order in which results were stored and the statement of data record modification 164 may comprise a database hash of that data, such that the database hash may also be indicative of the order in which results were stored.

Optionally, the verification details 610 may also comprise an operator ID 612 that uniquely identifies the operator 110. This may be used if, for example, there is more than one operator 110 authorised to execute instructions and modify the layer 2 data record 115.

Further optionally, the verification details 610 may comprise a verification record ID 618 that uniquely identifies the first verification record 600. Using the verification record ID 618, the first verification record 600 may be uniquely identified. The verification record ID may act as a sequence identifier indicative of the relative order of verification records stored on the Layer 1 DLTs, for example if it is an incrementing/decrementing number that increments/decrements the verification record ID 618 appearing in the preceding verification record. However, it will be appreciated that the first verification record 600 may be uniquely identified in any other way (for example, by the statement of data record modification 614, which is likely to be unique to each verification record stored on the first and/or second DLTs).

Further optionally, the first verification record 600 may comprise an instruction record 616, which is indicative of the instruction(s) to which the first verification record 600 relates (i.e., the instructions that are included in the corresponding verification set). As mentioned earlier and explained in more detail in 'instruction execution ordering' below, each verification set recorded by the operator 110 may comprise one or more executed instructions and each verification record stored on the first and/or second DLT by the operator 110 may correspond to a verification set (for example, each verification set may be uniquely numbered—optionally in a way that is indicative of the relative order/sequence of the verification sets—and the numbering may be related or the same as the verification record ID 618). The statement of data record modification 614 is indicative of the state of the layer 2 data record 115 after storing the results of execution of the one or more instructions in the verification set. The instruction record 616 is indicative of the one or more executed instruction(s) in the verification set and may be indicative of the relative order in which the instructions were executed.

The instruction record 616 may comprises one or more of: a Merkle Root generated based on at least part of the one or more executed instructions; and/or a hash (or some other unique record/identifier/value) of at least part of each executed instruction and/or a hash (or some other unique record/identifier/value) of at least part of two or more of the executed instructions. Where a hash/identifier of at least part of each executed instruction is included, they may optionally be ordered within the instruction record 616 in a way that is indicative of the order in which they were executed. Where a hash/identifier of at least part of two or more executed instructions is included, those instructions may be arranged in an order corresponding to the order in which they were sequenced and then the hash taken, such that the hash/identifier generated based on those instructions would then be indicative of the sequence of execution.

Figure 7:
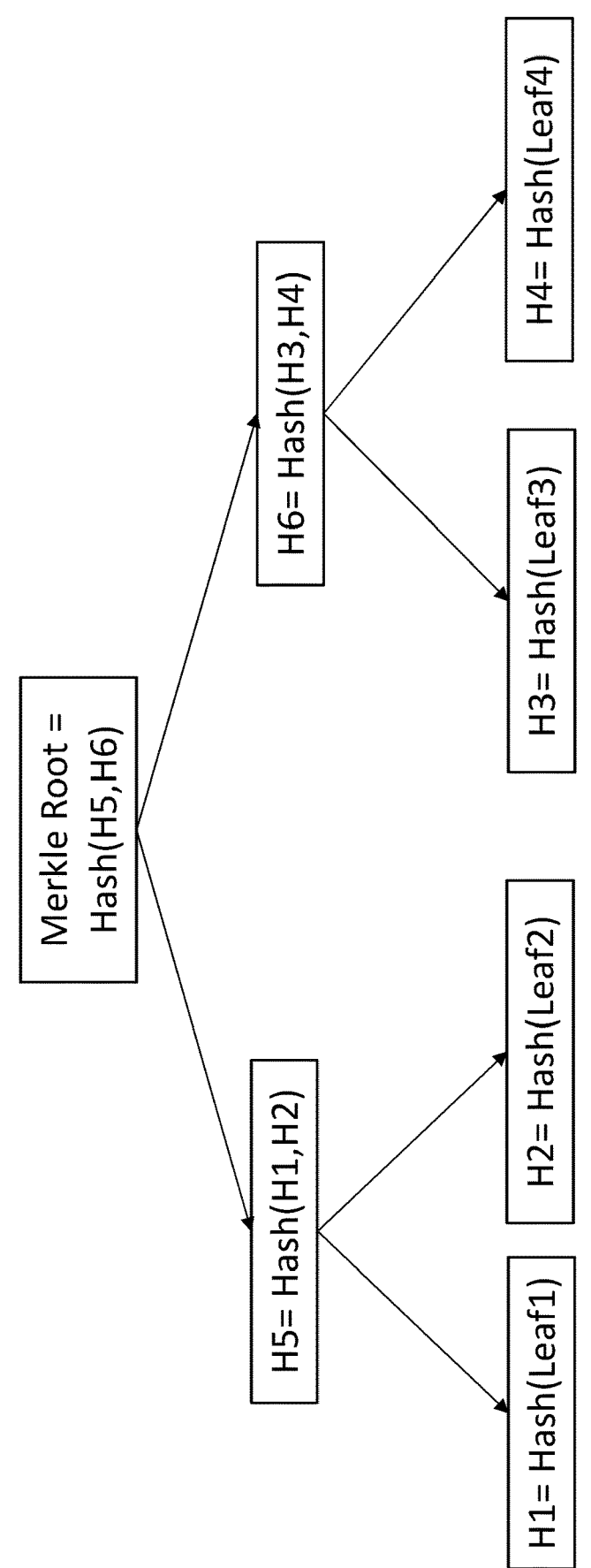
FIG. 7 shows an example of a Merkle tree for the layer 2 data record of the system of FIG. 1.

FIG. 7 shows an example of a Merkle tree for the layer 2 data record 115. The skilled person will readily understand the operation Merkle trees. In this particular example, four different results of instruction execution have been stored in the layer 2 data record 115 (eg, which may be a result of the execution of four different instructions, or fewer than four executed instructions, or more than four executed instructions, as explained earlier), which results in four leafs to the Merkle tree, each indicative of a stored result. However, it will be appreciated that the Merkle tree may comprise any number of leafs. In this example, hash H1 of Leaf 1 relates to the stored result of the executed first instruction 500. The content of Leaf 1, (i.e. the stored result of the executed first instruction, or a hash of the stored result of the executed first instruction), depends on the implementation of the system 100 and the nature of the instruction being executed. For example, it may include a copy of the Layer 2 data relating to the first user 140 after their requested data modification is performed, or it may be a returned result/receipt of a program/process triggered by the instruction (and optionally the instruction sequence number 516), etc. In one example where the first instruction 500 relates to a currency transaction, Leaf 1 may comprise the first user ID 510 and the balance of the first user account after the transaction has been executed. As explained earlier, the ordering of each leaf may be indicative of the order in which each result is stored, which in some implementations is also indicative of the sequence in which the operator 110 executed instructions (for example, where the operator is configured to store one or more result for each executed instruction, and store those results in an order corresponding to the order of instruction execution). For example, in FIG. 7 the instruction that caused the stored result included in Leaf 1 may have been executed before the instruction that caused the stored result included in Leaf 2, etc. The relative ordering of the leaves affects the Merkle root of the tree, such that the Merkle root would then be indicative of the relative ordering of the stored results.

Figure 8:
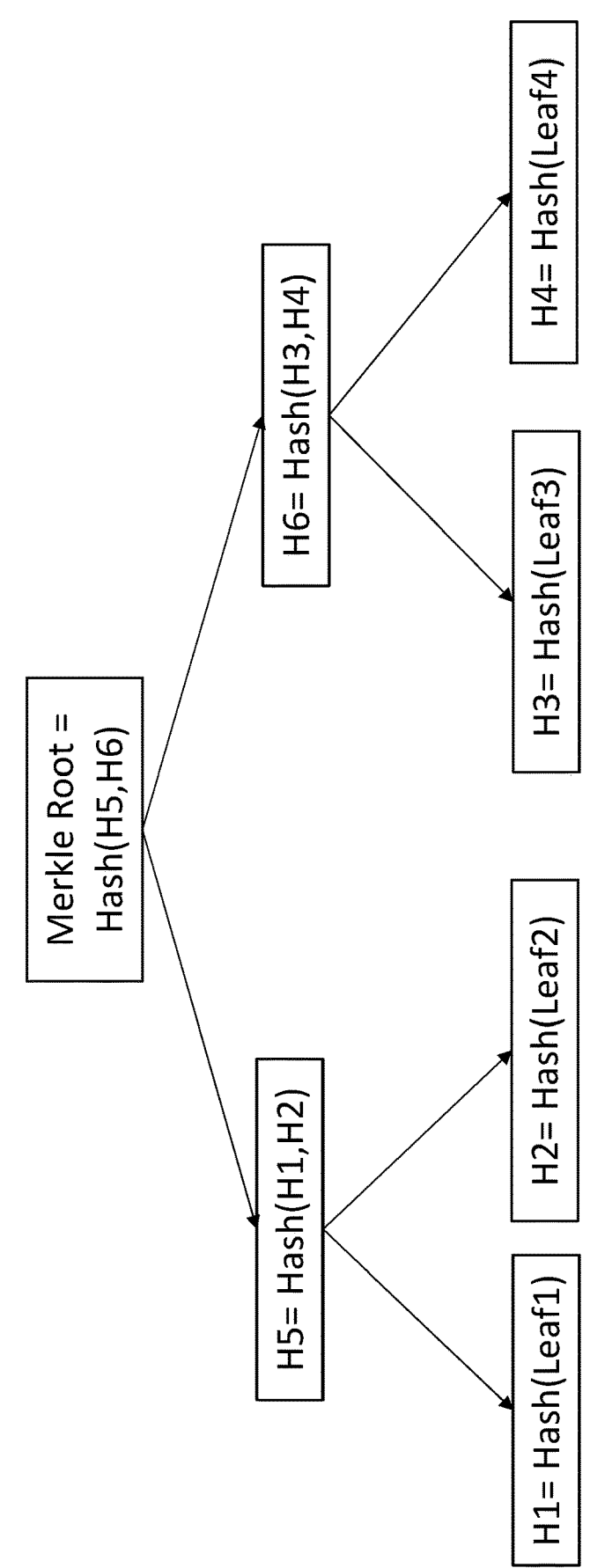
FIG. 8 shows an example of a Merkle tree for the instructions to which the verification record of FIG. 6.

FIG. 8 shows an example of a Merkle tree for the instructions to which the first verification record 600 relates. In this particular example, the first verification record 600 relates to four instructions that have been executed by the operator 110, which results in four leafs to the Merkle tree, each indicative of an executed instruction. However, it will be appreciated that the Merkle tree may comprise any number of leafs. In this example, Leaf 1 comprises at least part of the executed first instruction, for example the entirety of the first instruction 500, or a hash of the first instruction 500, or the instruction details 510, or a hash of the instruction details 510 (i.e., the unique cross-DLT ID described earlier). Optionally, each leaf may also comprise some data indicative of the execution of the instruction, for example a receipt or outcome of a process/program triggered by the instruction. If the relative execution ordering of each instruction to which the verification record 500 relates is important, the ordering of each leaf may be indicative of the sequence of execution of the instructions. For example, in FIG. 8 the Leaf 1 instruction may have been executed before the Leaf 2 instruction, etc. The relative ordering of the leaves affects the Merkle root of the tree, such that the Merkle root would then be indicative of the relative ordering of the executed instructions. However, if the relative ordering of the executed instructions to which the first verification record 600 relates is not important, the ordering of the leaves making up the Merkle root may be arbitrary. By generating a Merkle tree in this way, the operator 110 may include the Merkle root as part of the instruction record 616, thereby including a relatively small/short provable record of all of the executed instructions to which the first verification record 600 relates, and optionally also the order in which they were executed.

The operator 110 may store the first verification record 600 by broadcasting a further blockchain transaction to the first DLT 120 and/or the second DLT 130, with the first verification record 600 included within the user defined data field (as explained earlier with reference to FIG. 4). As a result, the first verification record 600 may be stored in an effectively immutable way that is readable to the first user 140, second user 150 and monitor entity 160. The first user 140 and/or monitor entity 160 may then use the first verification record 600 to verify that the operator 110 has correctly executed instructions, as explained later in 'proving instruction execution'.

Instruction Execution Ordering

The ordering of instruction execution may be very important for secure, reliable operation of the system 100. For example, it has previously been recognised that in order to prevent double spend cryptocurrency fraud, it must be possible to determine whether or not the cryptocurrency has been previously spent. A number of existing, standalone blockchains achieve this by virtue of the chronological nature of blocks on the blockchain, each block including within it a time stamp, and checking in the existing blocks that the cryptocurrency identified in the new transaction has not already been spent.

However, the inventors have recognised that reliable ordering may be important not only in currency related applications, but more generally for all applications. For example, it will be appreciated that in various internet and telecommunications fields and protocols, incorrectly ordered instructions/messaging may be exploited as a security and stability vulnerably. For example, each instruction described above may comprise communications data such as TCP/IP packets, and there are numerous ways in which the ordering and synchronisation communications data can affect the security of a system, such as messages/instructions falling out of the correct order or incomplete message/instruction sets resulting in the security of the system becoming compromised either in terms of integrity or availably. As explained earlier, the instructions of the present disclosure may relate to any form of data instruction/messaging. As such, the inventors have recognised that maintaining and/or verifying instruction execution order, for example when being used to carry instructions/messages but also when being used for any other purpose, may be of significant importance in achieving a secure, reliable and fraud-resilient system.

However, this is particularly challenging in a multi-DLT system where the system operates on a plurality of Layer 1 DLTs (for example, the first DLT 120 and the second DLT 130). For example, instructions posted across two or more different Layer 1 DLTs may need to be executed in a particular order to maintain secure, reliable and fraud-resilience of the system. One particular further challenge in maintaining and verifying instruction execution ordering and system consistency across the plurality of Layer 1 DLTs is 'blockchain rollbacks', where blocks within a blockchain may be lost. For example, a rollback may be caused by a blockchain fork, where one or more blockchain transactions that appeared on the shorter prong of the fork may be lost (or rolled back) from the blockchain. The skilled person will readily understand the potential for DLTs to fork, and the characteristics of how DLTs behave when there is a fork. A result of this may be that a rebroadcast distributed ledger transaction (that was previously lost in a ledger roll back) that includes a first instruction may appear on the distributed ledger after some other distributed ledger transaction that includes a second instruction, when in fact the first instruction was executed before the second instruction.

Figure 9:
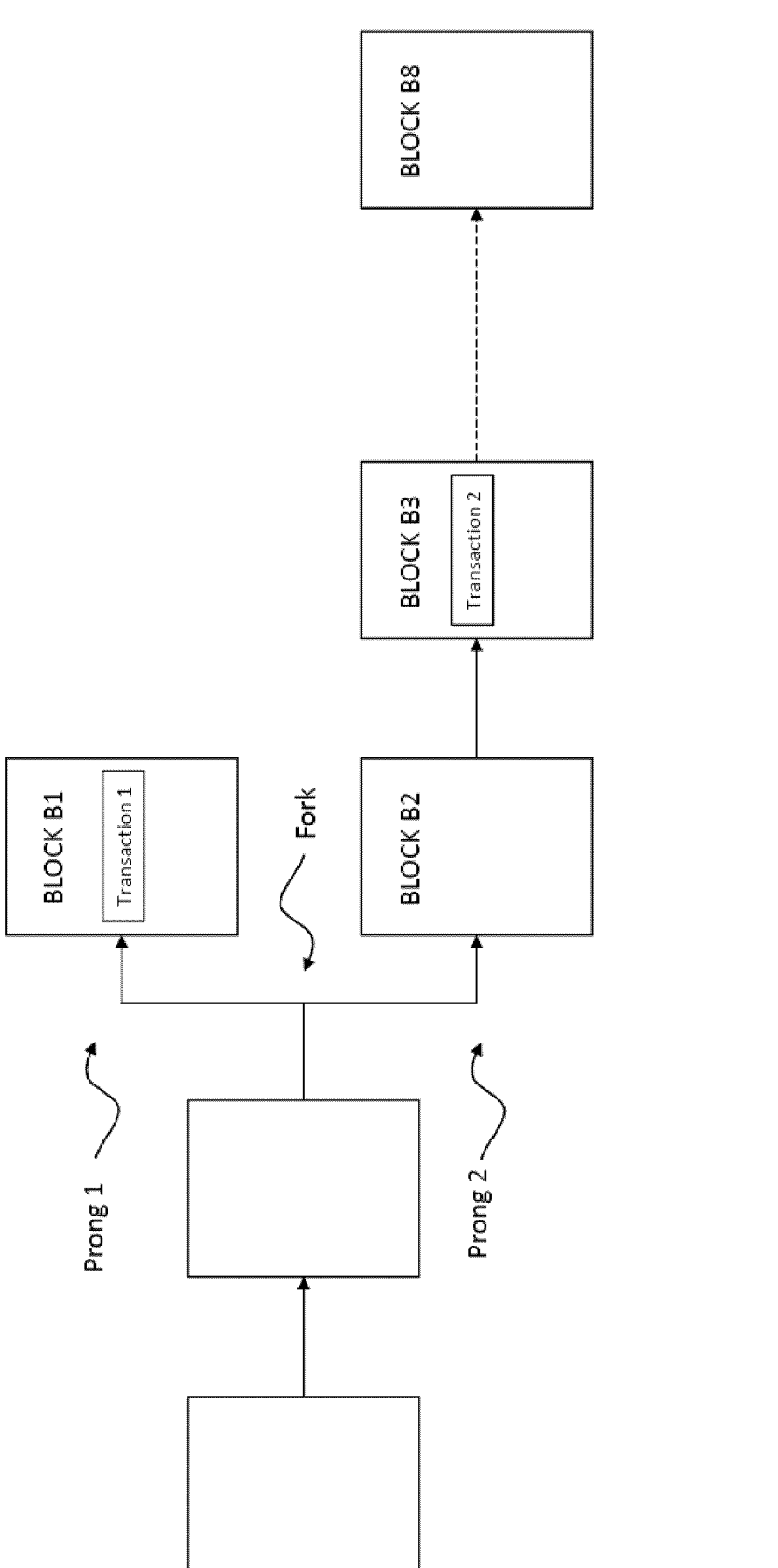
FIG. 9 shows an example representation of a fork in a block chain.

FIG. 9 shows an example representation of a fork in a blockchain. Transaction 1 is part of Block B1 which appears on "Prong 1" of the blockchain. However, as a result of the fork, it has effectively been lost from the blockchain since the blockchain has continued on the longer prong, "Prong 2". Transaction 2 is part of Block B3, which appears on "Prong 2". Sometime later, Transaction 1 may be appended to the blockchain as part of Block B8 on "Prong 2", for example by a node participating in the blockchain. Transaction 1 therefore appears later in the blockchain than Transaction 2. However, if it is important that Transaction 1 precedes Transaction 2 (for example, they relate to consecutive messages), this may cause a security or stability failure, or may allow fraud to take place, in an application that is utilising the blockchain. Other causes of rollback may be where the participants to a blockchain agree, for whatever reason, to roll the blockchain back to a particular earlier block (such as the Ethereum and Ethereum Classic fork).

Losing blockchain transactions may be particularly problematic in the present disclosure, since the relative ordering of instruction execution across different Layer 1 DLTs may be important for the security and stability of the system and the verifiability of the operator's 110 actions. In this case, simply replaying blockchain transactions on a Layer 1 DLT that have been lost due to a rollback may be insecure, since the replayed transaction(s) may then be out of sequence with the actual execution of instructions that took place.

To address these technical challenges, the inventors have implemented the use of the verification records described earlier.

Figure 10:
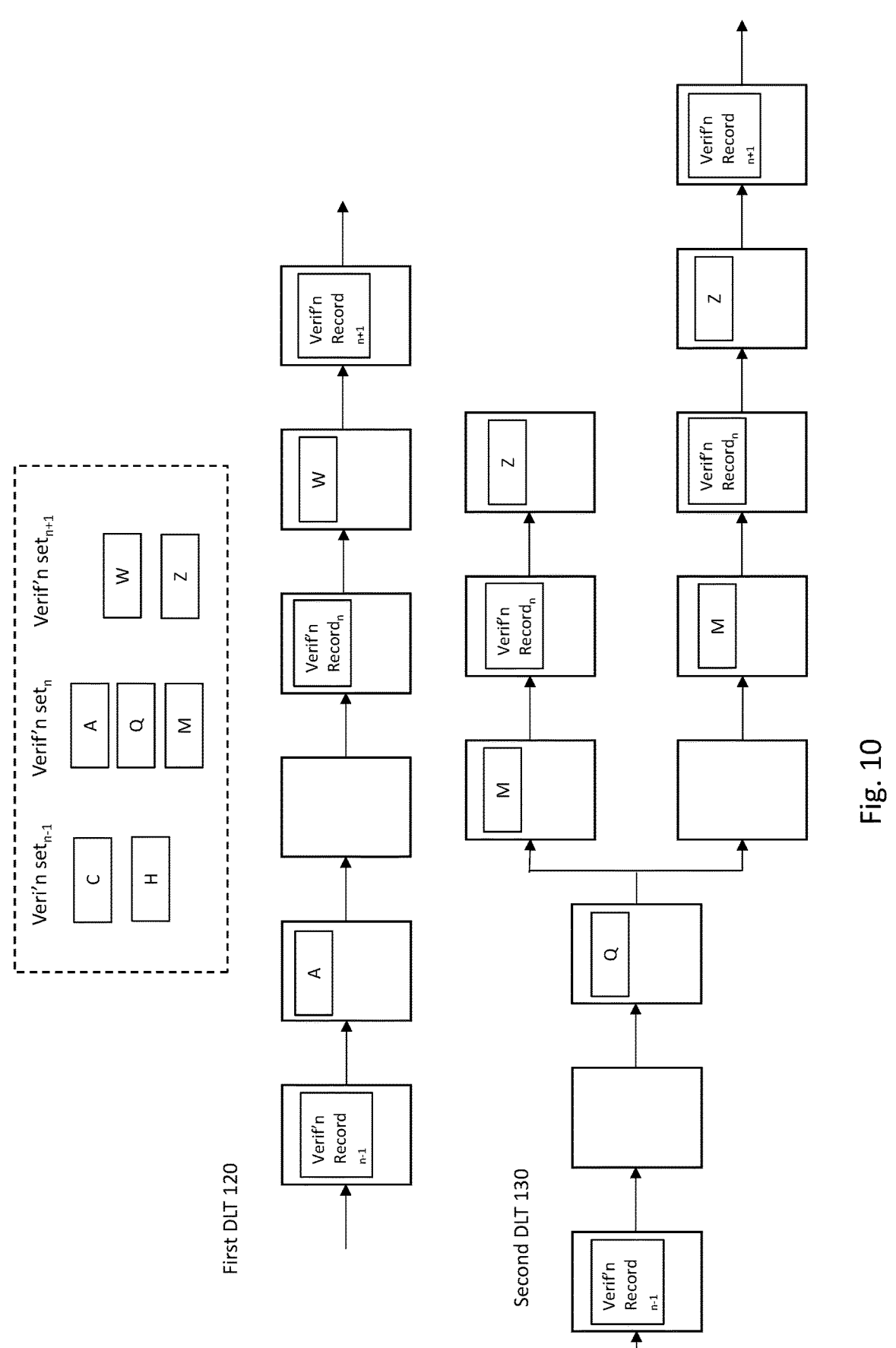
FIG. 10 shows an example of instructions and verification records on the first DLT and the second DLT as part of the process of FIG. 3.

FIG. 10 shows an example of instructions and verification records on the first DLT 120 and the second DLT 130. Each instruction is represented by a letter, for example A, Q, M, etc, and is included within a blockchain transaction in a block of either the first DLT 120 or the second DLT 130. Each instruction may take the form of the first instruction 500 described earlier. It will be appreciated that the first user 140 may issue to one of the Layer 1 DLTs an instruction, and then issue to the same or different Layer 1 DLT a subsequent instruction (i.e., the instructions can be issued to any Layer 1 DLT, such that the data stored in the electronic data store (eg, the Layer 2 data) with an association to the first user 140 is controllable equally on all of the Layer 1 DLTs).

Each blockchain transaction that includes an instruction A, Q, M, etc is identified by the operator 110 in Step S320 above, verified in Step S330 and executed in Step S340 (in this example, verification is performed on all of the identified instructions, and they all pass verification, however in an alternative only some of the identified instructions A, Q, M may go through verification at this time—others may go through verification later, for example resulting in them appearing in a later verification set/record). The operator 110 may be configured to determine the correct execution ordering of instructions A, Q, M, as explained earlier, thereby maintaining system security and reliability. As part of the process of Step S340, the operator 110 may also record (for example, in part of the layer 2 data record 115, or in any other memory accessible to the operator 110) a copy of executed instructions, for example in a 'verification set', as briefly mentioned earlier. For example, the operator 110 may identify instruction A and add it to a pending group. The operator 110 does the same with each further instruction that is identified (in this example, instructions Q and M), until a predetermined period of time lapses or until the pending group is full. When each instruction is executed, they may be stored in a verification set. If the relative ordering of instruction execution within a verification set is important for security/verifiability purposes, the relative order in which they were executed may be recorded, for example by virtue of the Merkle tree of the electronic data record 115 (FIG. 7) and/or the Merkle tree of executed instructions (FIG. 8, where, for example Leaf 1 comprises at least part of instruction A, Leaf 2 comprises at least part of instruction Q, etc). Consequently, regardless of the Layer 1 DLT on which the instructions are found, the operator 110 can maintain and record a relative ordering of transaction execution. If the relative ordering of instruction execution within a verification set is not important, no record of the sequence of execution may be recorded.

The operator 110 may generate a verification record corresponding to the verification set. The verification record may take the form of the first verification record 600 described above. For example, verification record$_n$ is generated based on the stored results of the executed instructions, which in this example are instructions A, Q and M (i.e., the statement of data record modification 614 is generated based on the stored results of executed instructions A, Q and M). Verification record$_n$ may also be generated based on at least part of the executed instructions A, Q and M (for example, the instruction record 616 may be generated based on at least part of each of instruction A, Q and M). Once generated, the operator 110 may optionally also record/store a copy of the verification record$_n$ in a location that is different to the Layer 1 DLTs (for example, in part of the layer 2 data record 115, or in any other memory accessible to the operator 110). This may be useful if the verification record$_n$ is lost from any of the Layer 1 DLTs in the future. The operator 110 may also store/record an association between the verification record$_n$ and the verification set$_n$ (or just the copies of the executed instructions that are part of verification set$_n$).

Optionally, before storing the latest verification record to at least one of the Layer 1 DLTs, the operator 110 may check that the preceding verification record$_{n-1}$ and/or the executed instructions to which the preceding verification record$_{n-1}$ relate (eg, the executed instructions that are part of preceding verification set$_{n-1}$) and/or the executed instructions to which the current verification record$_n$ relate (eg, the executed instructions that are part of the current verification set$_n$ for which the verification record$_n$ is about to be stored), are still present on the Layer 1 DLTs. If not, they may be added back onto at least one of the Layer 1 DLTs.

For example, it can be seen in FIG. 10 that the second DLT 130 has a fork. The lower prong of the fork goes forward, so the content of the upper prong is lost. Instructions M and Z, and verification record$_n$ all appeared initially on the upper prong of the second DLT 130 and would be lost as a result of the rollback caused by this fork. After the operator 110 has prepared verification record$_{n+1}$, it may check that the executed instructions included in verification set$_n$ and verification set$_{n+1}$, and also verification record$_n$, appear in the Layer 1 DLTs. At this time, the operator 110 may identify that instructions M and Z, as well as verification record$_n$, have been lost as a result of the rollback. The operator is able to broadcast a new blockchain transaction to the second DLT 130 from which instruction M was lost (which is possible, since the operator 110 kept a copy of instruction M, which it can include as part of the new blockchain transaction. It does not matter that that new blockchain transaction will originate from the operator 110 and be signed by the operator. The origin of the Layer 1 distributed ledger transactions is irrelevant to the present system. The user defined data field of the new transaction will include the entire copy of the previously lost instruction, which is the important information for the operation and verification processes of the present disclosure). This appears in FIG. 10 on the lower prong of the fork. It may also broadcast another new blockchain transaction that includes the verification record$_n$ and another new blockchain transaction that includes the instruction Z, both of which also appear in FIG. 10 on the lower prong of the fork. After that the latest verification record$_{n+1}$ may be stored on at least one of the Layer 1 DLTs. Whilst each of these new transactions is represented in a separate block, some or all of them may appear on the second DLT 130 within the same block. Furthermore, the order in which the new transactions appear on the second DLT 130 is not important, as will be understood from the explanation below.

The relative order in which executed instructions and verification records appear in the Layer 1 DLTs is not important, since the order in which they were actually executed (which can be important for the secure, safe and reliable operation of the system 100) is enshrined in the content of the verification records, regardless of where those verification records appear in the Layer 1 DLTs. In particular, each verification record may comprise a sequence identifier indicative of the relative sequence/order of the verification record. In this case, it is possible to discern that the instructions to which verification record$_{n-1}$ relates were all executed before the instructions to which verification record$_n$ relates, which were in turn all executed before the instructions to which verification record$_{n+1}$ relates.

In some system implementations, it may not be important to know the relative order of instruction execution within each verification record. For example, in systems where only a coarser level of execution order verifiability is needed to maintain security and stability of the system, or where the operator 110 is configured to execute instructions such that where the order of execution of two or more instructions is important, they each appear in a different verification set so that the ordering of execution can be verified in that way, or where the operator 110 is configured to include only one executed instruction in each verification set.

However, in other systems it may be important to know the relative order of instruction execution within each verification record i.e. verification execution ordering is required to a finder level. This may be achieved using the statement of data record modification 614 and/or the instruction record 616 described earlier.

In this way, regardless of rollbacks a record of each executed instruction, as well as verification data that enables the execution order to be checked and verified (either at a coarse level or fine level), can be maintained. Thus, users can be confident that once a verification record is included in a Layer 1 DLT, the related instructions will have been executed by the operator 110 and their ordering relative to earlier executed instructions can be verified, regardless of rollbacks on any of the Layer 1 DLTs. A further benefit of this relates to the time period within which a user can be confident that an instruction has been reliably enacted. For example, with many blockchain technologies, such as bitcoin, it is recommended that in order to rely on a blockchain transaction, it is best to wait for a particular number of blocks (such as 6 blocks) to be added to the blockchain after the block in which the transaction appears. This is to be sure that the transaction will not be lost due to a fork. Each block takes a period of time to be added (for example, about 10 minutes), so this wait can be significant. In the present disclosure, however, as soon as the operator stores, on a Layer 1 DLT, a verification record that is based on a user's instruction, the user can be confident that the instruction has been executed, regardless of potential rollbacks in the future (assuming the user has verified its content, as explained later). This may significantly increase the speed and efficiency with which users can be confident in the execution of instructions that they issue via a Layer 1 DLT.

It will be appreciated that whilst each block represented in FIG. 10 comprises only a single transaction, in practice it is likely that each block will comprise many transactions. Blocks that are empty in FIG. 10 would not in fact be empty, but in this example they do not include any blockchain transactions that have an instruction according to the present disclosure. In this example, the verification records are stored on both the first and second DLT. This may be preferable to improve robustness and data integrity, and therefore security, so that even in the event of a fork there should at all times be at least one copy of the verification records on the Layer 1 DLTs (it being extremely unlikely that two DLTs would independently fork at the same time, causing them both to lose the same verification record). However, this is not essential and in an alternative the verification records may be stored in only one of the Layer 1 DLTs.

Whilst in the above example the operator 110 checks that the immediately preceding verification record, and/or instructions of the immediately preceding verification set and/or current verification set, are present on the Layer 1 DLTs, the operator 110 may alternatively check at any time that the instructions of any preceding verification set, and any preceding verification record, still appear on the Layer 1 DLTs.

Proving Instruction Execution

To have confidence that the operator 110 is correctly executing instructions, the users may seek to verify the state of the layer 2 data record 115 using the modification records stored on the Layer 1 DLTs.

Figure 11:
FIG. 11 shows a sequence diagram representing an example process by which the first user in the system of FIG. 1 may verify the current state of their data on the Layer 2 data record.
Figure 11:

FIG. 11 shows a sequence diagram representing an example process by which the first user 140 may verify the current state of their data on the Layer 2 data record 115.

In Step S1110, the first user 140 communicates a first status enquiry to the operator 110 and/or monitor entity 160. The monitor entity 160 may be an entity configured to monitor the Layer 1 DLTs to identify blockchain transactions that include instructions and to identify verification records stored on Layer 1 DLTs. It may also be configured to determine which verification records relate to which executed instructions. This may be done using the instruction hashes that are included within the instruction record 616 of verification records, for example, by generating a hash of the relevant part of each instruction it identifies in the Layer 1 DLTs and comparing them to the hashes included in the instruction records 616 it identifies. Alternatively, where instruction hashes do not form part of the instruction record 616, the operator 110 may inform the monitor entity 160 which instructions are relevant for each verification record, for example via a communications channel between the monitor entity 160 and the operator 110.

Optionally, the monitor entity 160 may verify this information communicated from the operator 110 using the instruction record 616. For example, where the instruction record 616 of a verification record 600 indicated by the operator 110 includes a Merkle root, the monitor entity 160 may generate a Merkle root based on the instructions that the operator 110 has stated are part of that indicated verification record 600 and the order in which the operator 110 has stated they were included in the Merkle tree, and compare it to the Merkle root in the instruction record 616 of the indicated verification record 600. Alternatively, in addition to communicating which instructions are relevant for a verification record, the operator 110 may also provide a proof, such as a Merkle proof when the instruction record includes a Merkle root, or a Zero Knowledge Proof (ZKProof) where the instruction record includes a hash of two or more executed instructions, for proving the instruction record in the verification record. As a result, the monitor entity 160 can verify the information provided by the operator 110 (and verify the order of instruction execution within a verification record, where relevant).

Furthermore, the monitor entity 160 can optionally monitor the state of data kept in the electronic data record 115, for example by updating a shadow copy record that it keeps by performing each executed instruction and/or by virtue of the operator 110 communicating each stored result of an instruction execution to the monitor entity 160 (which is verifiable by virtue of the statement of data record modification 614 in each verification record). As such, the monitor entity 160 may have very similar operations and levels of knowledge to the operator 110, but unlike the operator 110 is not authorised to execute instructions, make changes to the layer 2 data record 115 or to store verification records on the Layer 1 DLTs.

The monitor entity 160 in the system 100 is optional, since the operator 110 can perform the same functionality as the monitor entity 160. However, there may be some benefits to having a monitor entity 160 that is independent of the operator 110, for example to prevent/detect instruction censorship by the operator 110 and/or detect fraud/inaccuracies from the operator 110 and/or provide a communications interface to the users so that the operator 110 is not required to communicate with users.

The first status enquiry may, for example, be a request for the current state of data associated with the first user in the electronic data record 115, or a request for the state of data associated with the first user in the electronic data record 115 at the time of a particular verification record in the layer 1 DLTs. The first status enquiry may comprise an identifier of the first user (for example, the first user ID 512) and information relating to the nature of the enquiry (for example, if it is a request for the state at the time of a particular verification record, it may include an identifier of the verification record, such as the verification record ID 618).

In Step S1120, the operator 110 and/or monitor entity 160 may communicate a status notification to the first user. The status notification may comprise an indication of the state of the first user data (for example, the current/latest state, or the state at the time of the verification record identified in the first status enquiry). The current/latest state may be the most recently stored result of instruction execution that is associated with the first user (for example, where each record stored by the operator in step S340 comprises, for example: a sequence number; the user ID; and the new data resulting from execution of an instruction, the indication of current state may be the stored result that has the most recent sequence number). The state at the time of a verification record identified in the first status enquiry may be the stored result associated with the first user based on which the verification record was generated, or the most recently stored result associated with the first user preceding the generation of the verification record (for example, when the verification record was generated based on stored results not associated with the first user). The status notification may further comprise a proof of state for use by the first user 140 in verifying the indicated state of the first user data. Where the first status enquiry is for the latest state of data, the status notification may even further comprise an indication of the verification record that corresponds to the most recent change to the state of the first user's data (i.e., the verification record that includes a statement of data record modification 614 that was generated at least in part based on the most recent change to the first user's data caused by a record of an executed instruction being stored by the operator 110). The proof of state may take any suitable form that enables the first user 140 to verify the indicated state of the first user's data using the proof of state and the statement of data record modification 614 in the relevant verification record. For example, where the verification records are configured such that the statement of data record modification 614 is a Merkle root, the proof of state may be a Merkle proof, using which the first user 140 can verify that the Merkle root (in the statement of data record modification 614) was generated by the operator 110 at least in part using the indicated state of the first user's data. Where the statement of data record modification 614 is a database hash, the proof of state may comprise a ZKProof.

Optionally, the operator 110/monitor entity 160 may also communicate to the first user a proof that the identified verification record relates to one or more particular executed instructions (either a particular instruction identified by the user in the first status enquiry, for example if the user is checking the status of their data after the execution of a particular instruction, or a particular instruction that resulted in the current state of the user data). This proof may take any suitable form. For example, where the verification records are configured such that the instruction record comprises is a Merkle root, the proof may be a Merkle proof, or where the instruction record includes a hash of two or more executed instructions, the proof may be a ZKProof. However, if the verification records are configured to comprise a hash of at least a part of the executed instructions to which they relate, the first user may straightforwardly prove that any particular instruction related to them forms part of the identified verification record.

In Step S1130, the first user 140 may look up the relevant verification record in the first DLT 120 or second DLT 130 and retrieve any information from it that is relevant (for example, the statement of data record modification 614 and/or at least part of the instruction record 616).

In Step S1140, the first user 140 may verify the state of their data using the proof of state and the retrieved part of the relevant verification record. Consequently, statements from the operator 110 and/or monitor entity 160 to the first user 140 regarding the state of their data can be proved or disproved using cryptographically secure information that is accessible on the first DLT 120 and/or second DLT 130.

The indication of state that the users receive may take any suitable form, depending on the nature of the user data stored in the electronic data record 115. For example, if the user data relates to a financial currency, the state may indicate the current balance of the user account, which will be altered each time a result of an executed instruction related to the first user is stored in the electronic data store 115. In a further example, if the user data comprises records/results of processes/communications/operations that are triggered by instructions they have put on the Layer 1 DLTs, the state may comprise a record/result that has been received and stored.

Optionally, a user may read the Layer 1 DLTs and/or query the operator 110/monitor entity 160 to identify instructions appearing on the Layer 1 DLTs that relate to them (for example, instructions originating from them, or instructions that identify them in any way, for example as the recipient of a financial transaction). They may also query the operator 110/monitor entity 160 to determine which instructions have been executed and the verification record(s) that was generated based on the result of each instruction execution (for example, they may ask the operator 110/monitor entity 160 if any of instructions A, B, C, etc have been executed, and in return they may receive an indication that instruction A has been executed and is included in verification record Y, optionally with a proof of inclusion such as a Merkle proof or ZKProof, as described above). The user can then know which instructions are said to have been executed and when they were executed (and verify their inclusion in the indicated verification record), and can then verifiably check the state of their data as a result of the instruction execution (for example, by querying the state of their data at the time of verification record Y and then verifying the returned indicated state, as described above).

As a result, the users may issue instructions to any of a plurality of Layer 1 DLTs in a way that results in the secure, consistent and verifiable execution of those instructions. Consequently, users can control data using any two or more different Layer 1 DLTs in a secure, safe, consistent and trustworthy way.

The skilled person will readily appreciate that various alterations or modifications may be made to the above described aspects of the disclosure without departing from the scope of the disclosure.

In the explanation above, the operator 110 stores ordered verification sets, each comprising a copy of one or more executed instruction. However, in an alternative, the operator 110 may simply store each executed instruction with an association to the verification record that was generated in part on the result of the executed instruction.

The relative ordering of each verification record may be kept, for example by the verification record ID, so the relative ordering of instruction execution between verification records can be enshrined in this way (and the relative ordering of instruction execution within verification records may also be enshrined by virtue of the statement of data record modification 614 and/or instruction record 616).

The instruction record 616 in the verification records 600 is optional. For example, some verification records may relate to an initiating state for one or more parts of the electronic data record 115, such as a starting balance for a user account in the Layer 2 record. In this case, the instruction record 616 may be omitted and the statement of data record modification 614 may be indicative of the initiating state of the one or more parts of the electronic data record 115.

The first user 140 and/or second user 150 may optionally comprise a smart contract or some other form of triggerable computer program/process. The user processes described above may be carried out by the smart contract, for example, and optionally further processes may be performed depending on the result. For example, the smart contract may be triggered by the presence of a particular instruction on the first DLT 120. It may verify the execution of the instruction using the process described with reference to FIG. 11 and optionally, if verified, perform a further operation. In one particular non-limiting example, data, such as a token, may be migrated from a Layer 2 account to a Layer 1 account on a specific Layer 1 DLT in this way. For example, an instruction to transfer a token from a Layer 2 account to a migrating layer 2 account may be posted to one of the Layer 1 DLTs. A smart contract may be triggered by virtue of the reference in the instruction to the migrating layer 2 account. Execution of this instruction causes the result to be stored on the Layer 2 electronic data record 115 such that the migrating account has the token added to its balance. The smart contract may verify the execution of the instruction (for example, utilising the user verification process described above with reference FIG. 11) and, if verified, add a token to a Layer 1 DLT (for example, at a predetermined Layer 1 token:Layer 2 token ratio). Optionally, the smart contract may subsequently issue a further instruction to one of the Layer 1 DLTs for the deletion of the Layer 2 token held in the migrating account, or the Layer 2 token in the migrating account may be locked or deleted in any other suitable way. A similar process may be performed in reverse to migrate a Layer 1 token to a Layer 2 account.

Throughout the disclosure, the term 'hash' is frequently used. Where a hash is generated based on data, any other suitable type of value uniquely indicative of the data may alternatively be generated using any suitable process. For example, where a hash of at least part of an executed instruction is generated, in an alternative a value uniquely indicative of at least part of the executed instruction may be generated, using any suitable process, based on the executed instruction.

In some aspects of the disclosure the use of Merkle trees and Merkle roots is disclosed, for example in relation to the layer 2 data record 115 and the statement of data modification 164; and/or the executed instructions and the instruction record 616. This is merely one non-limiting example structure/approach that may be used, with others being possible, as indicated earlier. As a further example of a type of data structure that preserves, or is indicative of, relative ordering of the information in the data structure, Verkle trees and Verkle roots may be used for the layer 2 data record 115 and the statement of data modification 164; and/or the executed instructions and the instruction record 616. Verkle trees are similar to Merkle trees, but allow for more than two items to be combined at each level. Any other type of data structure that preserves, or is indicative of, relative ordering may alternatively be used for the layer 2 data record 115 and the statement of data modification 164; and/or the executed instructions and the instruction record 616. In the above described examples, the system 100 includes a single operator 110 and a single monitor entity 160. However, in an alternative the system 100 may comprise two or more operator entities 110 and/or two or more monitor entities 160, each functioning as described above. For example, if there are two or more operator entities 110, they may be configured to share the processing load, such as producing alternating verification records, etc. In a further example, if there are two or more monitor entities 160 they may each independently be performing the monitoring function described above.

The aspects of the present disclosure described in all of the above may be implemented by software, hardware or a combination of software and hardware. For example, the functionality of the operator 110, users and/or monitor entity 160 may each be implemented by software comprising computer readable code, which when executed on one or more processors (such as one or more microprocessors, or programmable logic) of any electronic device, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way.

The invention claimed is:

1. A computer implemented method for providing communication between two or more different distributed ledgers, the method comprising:

monitoring a plurality of distributed ledgers for distributed ledger transactions comprising an instruction to be executed, wherein each of the plurality of distributed ledgers includes multiple decentralized nodes sharing a common consensus protocol;

identifying a first plurality of distributed ledger transactions, that have each been accepted onto on any of the plurality of distributed ledgers, wherein each of the first plurality of distributed ledger transactions comprises an instruction to be executed;

verifying at least some of the first plurality of instructions in the identified first plurality of distributed ledger transactions to obtain verified instructions; and for each of the first verified instructions, executing the verified instruction to trigger a computer program/process held on an electronic data record, wherein the electronic data record is different to the plurality of distributed ledgers; and storing, in the electronic data record, a result of the execution of the verified instruction;

after executing the positively verified instructions of the first plurality of instructions, storing, on at least one of the plurality of distributed ledgers, a first verification record indicative of each stored result in the electronic data record, wherein the first verification record is indicative of the order in which the positively verified instructions of the first plurality of instructions were executed.

2. The method of claim 1, further comprising:

after executing the positively verified instructions of the first plurality of instructions, generating a first instruction record based on the executed instructions of the first plurality of instructions, wherein the first verification record further comprises the first instruction record.

3. The method of claim 2, wherein the first instruction record is indicative of the order in which the positively verified instructions of the first plurality of instructions were executed.

4. The method of claim 1, wherein the first verification record comprises a sequence identifier indicative of a relative order of verification records stored on the at least one of the plurality of distributed ledgers.

5. The method of claim 1, further comprising:

determining an order in which to execute the first plurality of instructions that are positively verified; and executing the first plurality of instructions that are positively verified in accordance with the determined order.

6. The method of claim 1, wherein at least one of the plurality of first distributed ledger transactions appears on a first distributed ledger of the plurality of distributed ledgers and comprises an instruction for executing a process associated with a first user; and wherein at least one other of the plurality of first distributed ledger transactions appears on a second distributed ledger of the plurality of distributed ledgers and comprises an instruction for executing a further process associated with the first user.

7. The method of claim 1, further comprising:

identifying a second plurality of distributed ledger transactions, each appearing on any of the plurality of distributed ledgers, wherein each of the second plurality of distributed ledger transactions comprises an instruction to be executed;

verifying at least some of the second plurality of instructions; and for each of the second plurality of instructions that is positively verified:

executing the instruction; and storing, in the electronic data record, a result of the executed instruction.

8. The method of claim 7, further comprising:

after executing the positively verified instructions of the second plurality of instructions, storing, on at least one of the plurality of distributed ledgers, a second verification record indicative of each result stored in the electronic data record as a consequence of the executed instructions of the second plurality of instructions.

9. The method of claim 7, wherein at least one of the plurality of first distributed ledger transactions appears on a first distributed ledger of the plurality of distributed ledgers and comprises an instruction for executing a process associated with a first user; and wherein at least one of the plurality of second distributed ledger transactions appears on a second distributed ledger of the plurality of distributed ledgers and comprises an instruction for executing a further process associated with the first user.

10. The method of claim 1, wherein each of first plurality of instructions comprises an identifier of a user associated with the instruction and each result of executed instruction is stored in the electronic data store with an association to the user that is associated with the executed instruction, wherein the method further comprises:

receiving a first status enquiry in relation to a state of electronic data that is stored in the electronic data store with associated to a first user; and communicating, in response to the first status enquiry, a status notification comprising:

an indication of the state of electronic data associated with the first user, and a proof of state for use in verifying the indicated state of electronic data associated with the first user.

11. A computer program configured to perform the method of claim 1 when executed on at least one processor of an electronic device.

12. An electronic device configured to perform the method of claim 1.

* * * * *